United States Patent

[11] 3,543,910

| [72] | Inventors | George C. Devol<br>990 Ridgefield Road, Wilton, Connecticut 06897;<br>Paul S. Martin, 189-54 43 Road, Flushing, New York 11358 |
|---|---|---|
| [21] | Appl. No. | 748,703 |
| [22] | Filed | July 30, 1968 |
| [45] | Patented | Dec. 1, 1970 |

[54] WORK-HEAD AUTOMATIC MOTIONS CONTROLS
55 Claims, 23 Drawing Figs.

[52] U.S. Cl. .................................................. 198/34, 214/1, 214/8.5
[51] Int. Cl. .................................................. B65g 47/08
[50] Field of Search .......................................... 214/1(B3), 1(B4), 1(B2), 1(B), 1(RCM), 147(T); 198/34

[56] References Cited
UNITED STATES PATENTS

| 3,051,328 | 8/1962 | Brown | 214/1(B3)UX |
| 3,306,471 | 2/1967 | Devol | 214/1(B3)UX |

*Primary Examiner*—Robert G. Sheridan
*Assistant Examiner*—George F. Abraham
*Attorney*—Paul S. Martin

ABSTRACT: The disclosed apparatus has a workhead movable in program-controlled three-dimensional paths by an extendable and retractable arm that is movable through angles both in azimuth and elevation. The workhead may be any of various tools. As shown, the workhead has article-gripping jaws. The workhead is also operable about horizontal and vertical axes at the end of the arm. Each motion is produced is produced by a respective drive unit, especially a hydraulic actuator, and has a corresponding control. Inverse angular controls can be used to enforce equal and opposite angular movements of the workhead about its axes corresponding to the angular motions of the arm in elevation and azimuth.

In one form of the apparatus, the control information is supplied directly to the respective polar coordinate controls, in polar form. In another form of the apparatus, the control information is supplied in rectangular coordinates and controls the operation of a manipulating unit having respective parts movable in mutually perpendicular directions, and the manipulating unit operates a lever that is movable in elevation and azimuth and operable lengthwise by elongation and contraction, and in turn, the level acts as a converter or as part of a converter in operating the polar coordinate controls of the workhead operating apparatus.

There is a linear-motion control in both forms of apparatus additional to the controls already mentioned for producing a control effect to cause straight-line motion of the workhead in a direction that involves lengthwise and angular motion of the arm that carries the workhead. Information can be supplied to this linear-motion control in increments, as in pallet loading; or it can be supplied continuously to enable the workhead to carry out a program of control information in relation to a work space on a continuous conveyor. There is a converter in the polar coordinate apparatus that responds to the linear-motion control and provides polar coordinate output for introducing offset input into the polar coordinate controls that otherwise respond to the polar coordinate control information. In the rectangular coordinate apparatus, the linear-motion control introduces an offset in the manipulating unit that responds otherwise to its input control information.

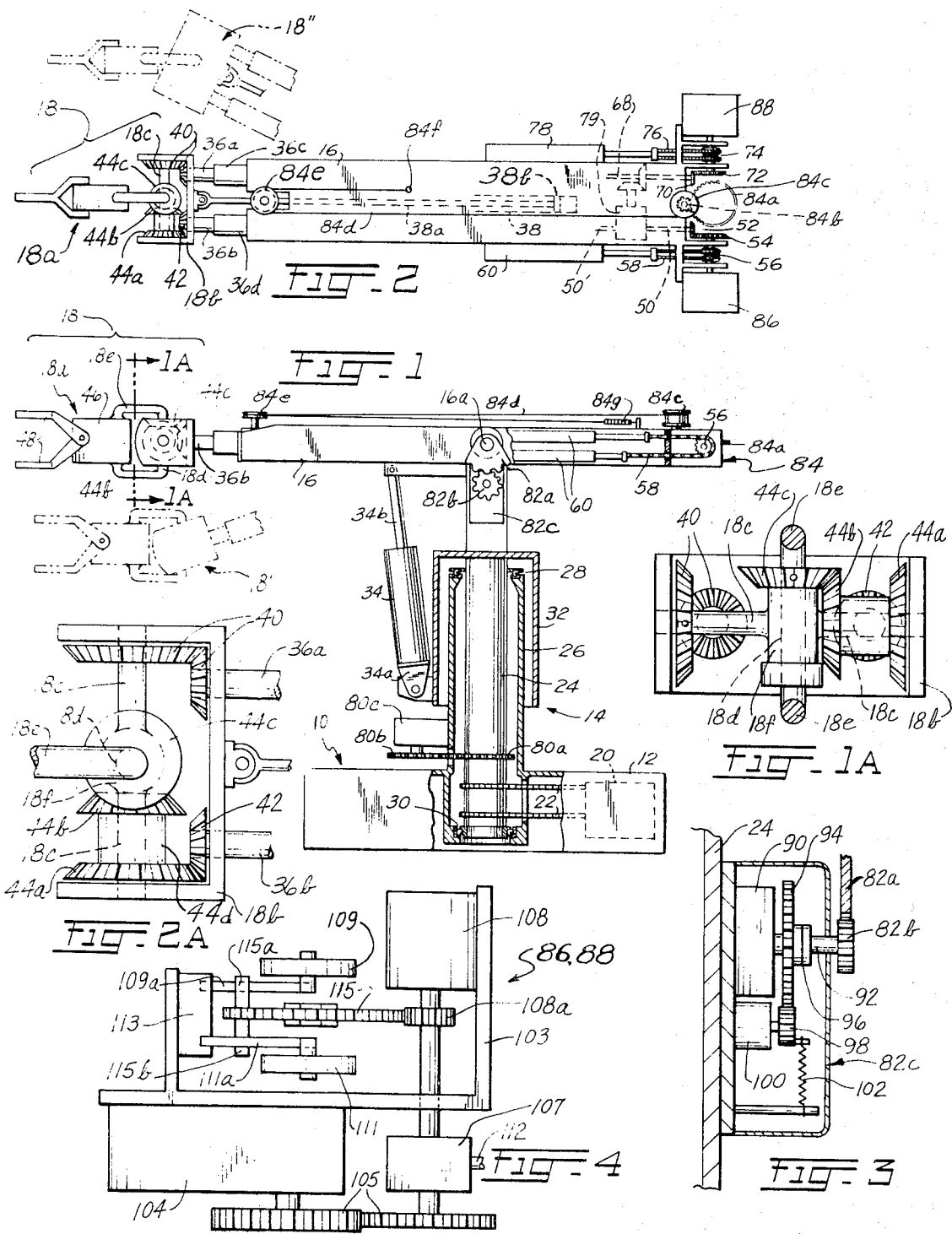

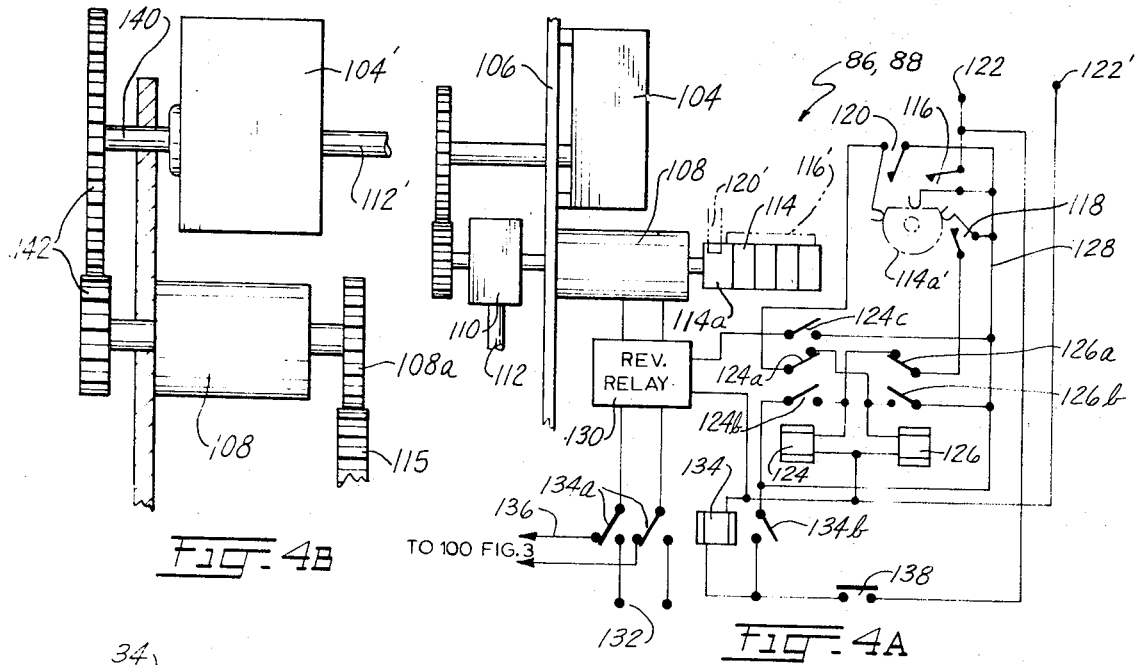
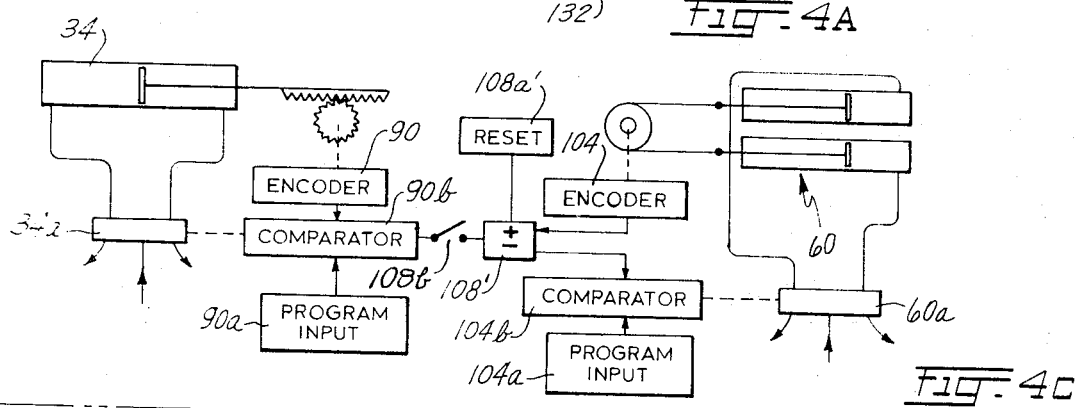
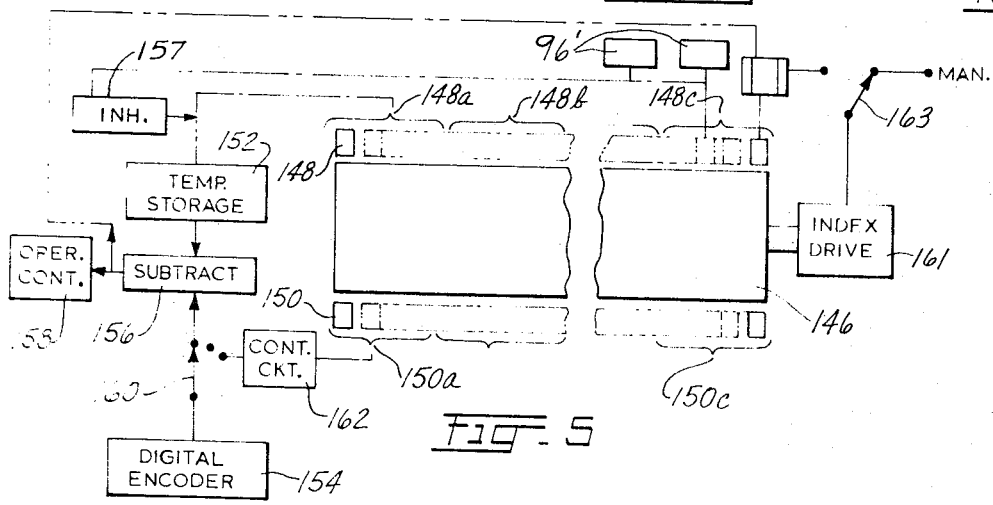

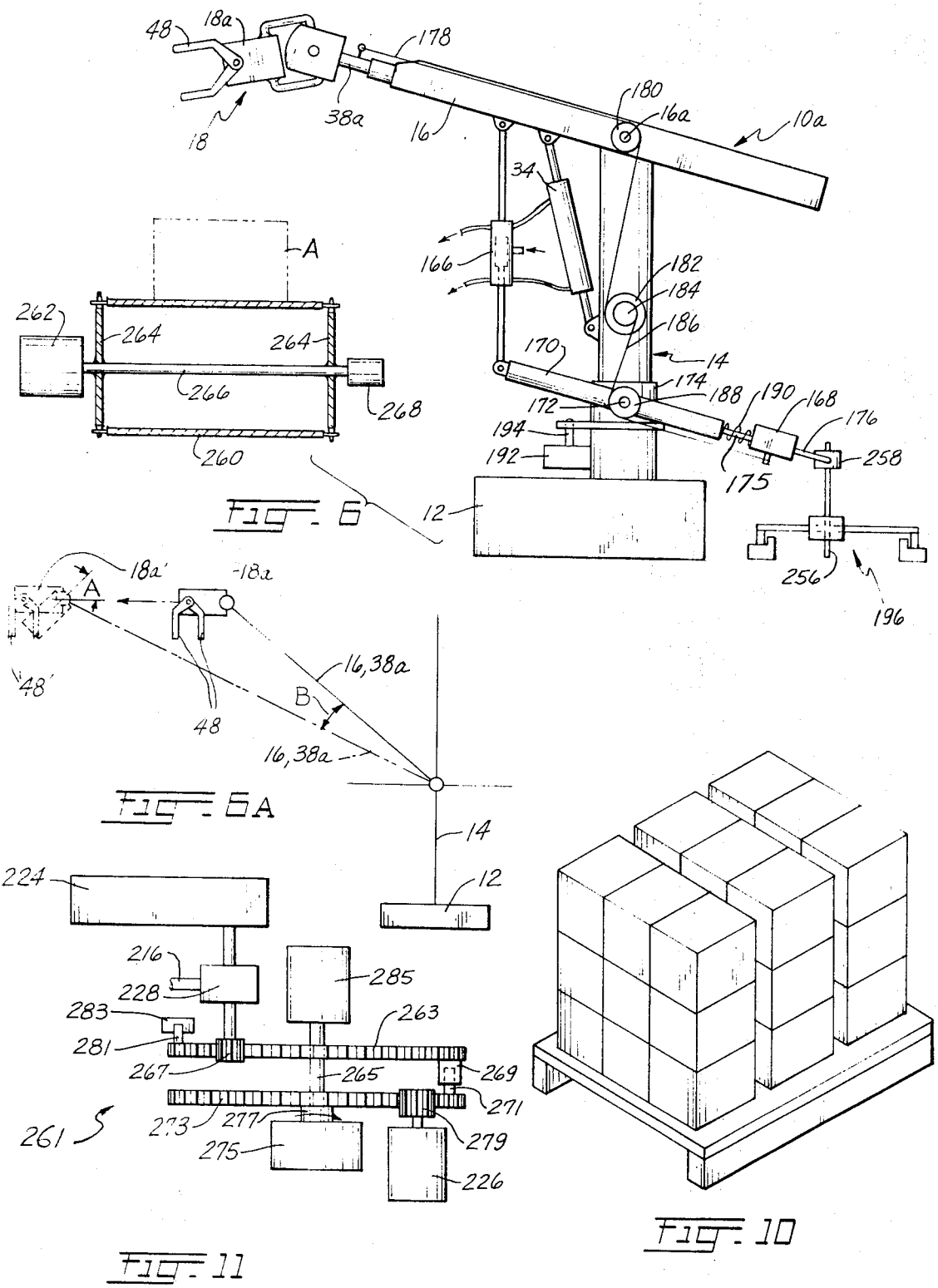

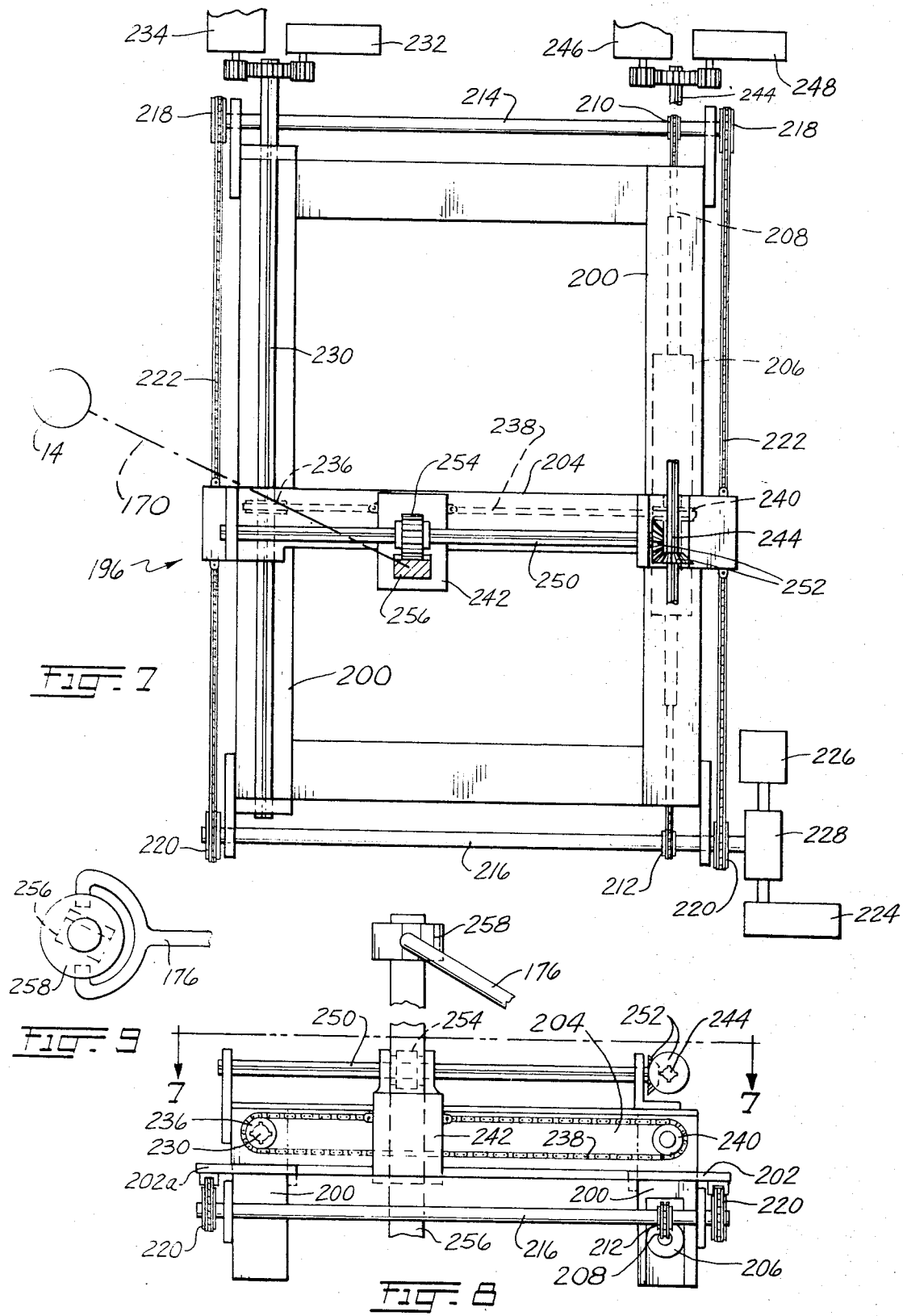

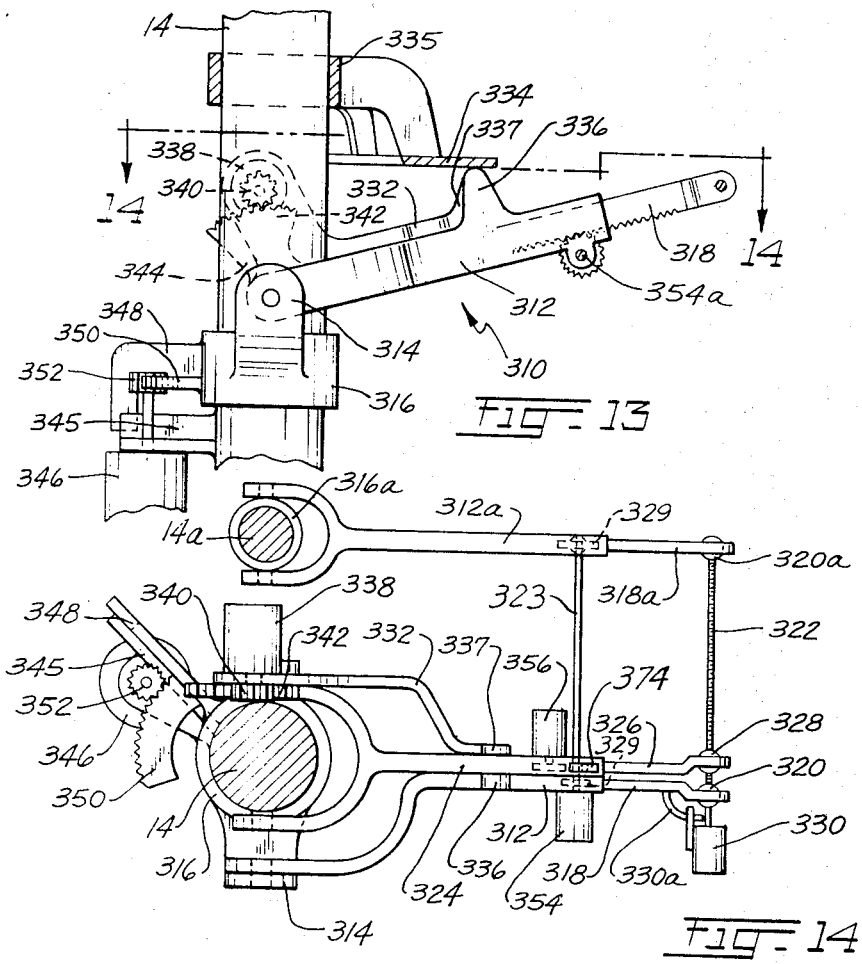
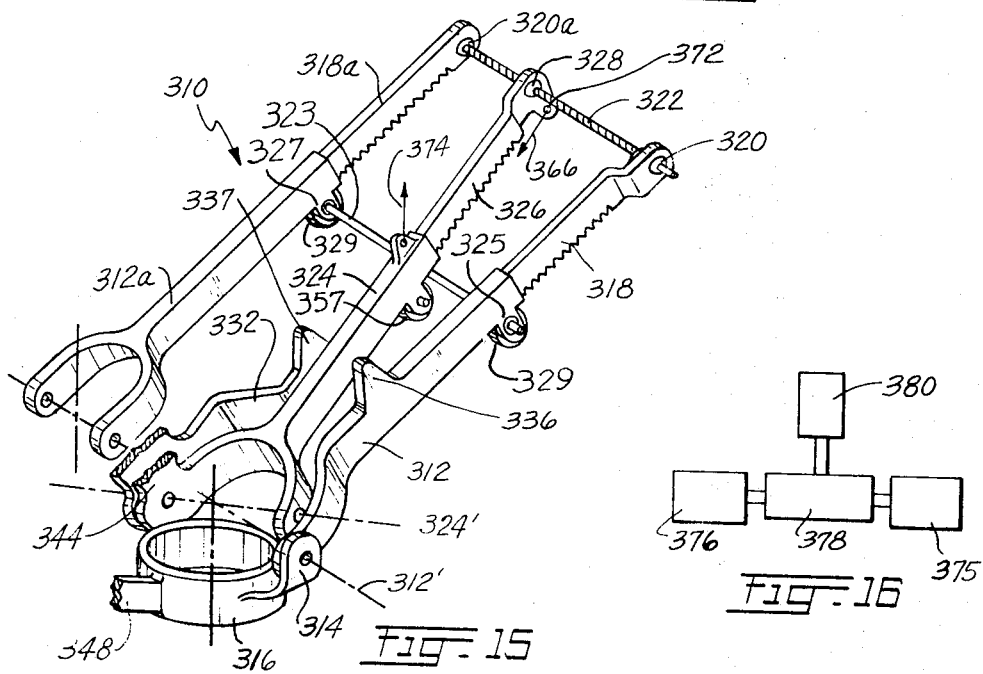

WORK-HEAD AUTOMATIC MOTIONS CONTROLS

WORKHEAD WITH AUTOMATIC MOTIONS CONTROLS

The present invention relates to apparatus in which a workhead is operable automatically to execute a sequence of motions. The workhead may assume various forms, such as a drill, or a paint spray gun, or an assembling tool, or jaws of a resistance welder; but the features of the invention are described below primarily in relation to article transfer apparatus in which the workhead has an article gripper.

Apparatus of this type has been developed for operation under program control to execute prescribed sequences of operation. The apparatus is very flexible, since it can be adapted to new uses merely by developing a new program. Typically it includes a workhead that is carried through space in a primary three-dimensional pattern of motions and the workhead itself is operable in secondary motions to assume various attitudes as it is carried through its pattern of motions. Examples of such apparatus are shown in U.S. Pat. Nos. 2,988,237, 3,251,483, 3,279,624 and 3,306,471 issued to G. C. Devol.

A particularly useful form of construction involves an arm that carries the workhead where the arm is operable about at least one axis. In a commercial program-controlled article transfer apparatus, there are three primary motions of the arm, about vertical and horizontal axes, and telescopic elongation and retraction of the arm; and in addition a unit carried by the arm is capable of moving the workhead in what may be called secondary motions, such as a "wrist bend" motion. In a U.S. Pat. application, Ser. No. 748,702, filed concurrently herewith by George C. Devol, one of the applicants herein, a related improvement is disclosed, providing for automatic correlation of a workhead pivotally carried by an arm that is itself operable about a parallel pivot, to maintain constant aim of the workhead.

Because of the primary angular motions involved in that type of apparatus, the straight line motion of the work head in any one direction involves a certain amount of complexity. The problems are further complicated where there is a sequence of positions to which the workhead is to move which are related to each other in a basically rectangular coordinate system. Each required motion of the head along a line parallel to an axis in a rectangular coordinate system must include control constituents that take into account the angular motions of the arm and the arm length change. For example, an article transfer apparatus may be applied to the loading or unloading of pallets with articles in a rectangular pattern of rows, columns and layers. In another example, a workhead may be required to keep up with one section of a conveyor moving along a straight line. The latter problem is dealt with in one manner in U.S. Pat. No. 3,283,918 to G. C. Devol, wherein the program-controlled apparatus is bodily shifted in synchronized motion with one segment after another of the conveyor to execute its program cycle.

Accordingly, an object of the present invention resides in providing motion control apparatus that responds to linear control information for controlling a workhead carrying an arm that is movable about at least one axis and wherein the arm is operable lengthwise to extend and retract the workhead, and more particularly wherein the arm is movable about two mutually perpendicular axes.

A further object of the invention resides in providing motion control apparatus that is adapted to respond to instructions given in terms of rectangular coordinates in a plane or in space for controlling the motions of an arm that moves a workhead to various extended and retracted positions and about at least one axis, and more particularly where the apparatus is one that has an arm operable about mutually perpendicular axes.

As indicated above, program-controlled apparatus has heretofore been available commercially that has an arm operable about horizontal and vertical axes and carries a workhead capable of angular motion on the arm. The unit carried by the arm has been capable of executing a "wrist bend" motion. The workhead itself has been capable of "twist" motion.

An object of this invention resides in providing such apparatus with increased capability, by adding a further motion to the workhead support, so as to adapt it to double wrist bend motions about mutually perpendicular axes. The "twist" motion may be retained if desired.

An object related to the foregoing feature resides in providing means for coordinating the operations of a workhead through changes in both azimuth and elevation angles in relation to a supporting arm with changes in the angles of azimuth and elevation of the arm for maintaining constant aim or attitude of the workhead as it is bodily transported by its supporting arm through complex motions in space.

A still further object resides in providing a means for modifying the operation of apparatus having an arm movable through an angle about an axis and carrying a workhead to extended and retracted positions, and wherein the workhead itself is operable about a parallel axis, so that the angle of the arm and its length change, and the angle of the workhead relative to the arm changes, so as to move the workhead along a straight line path, to maintain a constant relationship of the workhead with a point in space that is moving along a straight line. For example, the point may be identified with a discrete portion of a conveyor moving along a straight line path.

A further object of this invention resides in modifying the operation of apparatus of such construction to execute a program of operations established initially in a stationary space, where the space is then set in motion along a line passing the apparatus.

A further object resides in adapting apparatus of the type having an arm that can extend and retract a workhead and where the arm is operable through angles of azimuth and elevation, and where the workhead is operable relative to the arm through angles of azimuth and elevation, so that the workhead can maintain a constant relationship with a point in space that moves along a straight line. A still further object is to adapt such apparatus to execute a program of operations in relation to a segment of a conveyor in motion where the program was established in relation to a stationary volume or space.

The cooperation of program-controlled apparatus of the construction considered above with a conveyor is but one example of automatic operation under a program control, modified by a second source of control information. More generally expressed, an object of the present invention resides in providing apparatus normally operable under control of a main source of control information to move a workhead through prescribed patterns of motion, with offset control means and a supplementary source of offset control information to modify the pattern of motions that would otherwise be executed under control of the main source of control information.

Another object related to the foregoing resides in adapting such apparatus to alternate operation with and without control by the offset source of information. Such a situation arises (for example) where an article transfer unit is to transfer a series of articles from a stationary supply point or a pattern of stationary supply points to a point or a series of spaced-apart points all of which are identified in the program of the apparatus, but where the delivery point or points are set in motion on a conveyor. The article holder operates solely under control of the program in approaching the stationary supply point time after time, but it moves to a progressively advancing point or to progressively advancing mutually separated delivery points in alternation with its motions to the supply point or points under an offset control that represents the motion of the conveyor, and where the offset control is alternately in effect and removed from effect.

The foregoing and other objects, advantages and features are realized in the illustrative apparatus described below and shown in the accompanying drawings that form part of the disclosure of such apparatus. Generally, two embodiments are shown. A basic structure useful in both embodiments includes an arm that is carried on a rotatable post and pivoted on the post about a transverse axis to raise and lower a workhead carried by the arm. That two axes are involved is of distinct advantage but broader aspects of the invention apply to a structure in which the arm is bodily moved, linearly, for raising and lowering the workhead. The workhead is carried by the arm for corresponding movements about horizontal and vertical angles of "tilt" and "swing," these being the motions referred to above as double wrist bends. The workhead itself may be arranged to rotate about its axis, and it may have its own further adjustments or controlled actuators, as may be needed. In the illustrative structure, the tilt angle and the swing angle are coordinated in several ways with the angles of elevation of the arm and turn of the arm-supporting post.

The control apparatus for such a structure for adapting it to respond to linear-motion control information is described in connection with two illustrative embodiments shown in the drawings. Each includes a converter that responds to linear control operation and provides output control for the required motions of the arm that carries the workhead.

The converter includes a lever having the same motion capabilities as the arm that carries the workhead. The lever operates servomaster controls, while the actuators of the arm in its various motions are controlled by what may be considered servoslave units. The master and slave controls are coupled to each other variously, e.g., electrically and electromechanically.

In one of these embodiments, the converter responds to three-dimensional rectangular coordinate control information. This information may come from various sources, as from a recorded program, or a computer, or both. In one of its coordinates there is an offset input of linear control, from the conveyor. The pattern of operations of the workhead in space is controlled by information from the main source of control information, here the program drum, and the operations then ensue in relation to a stationary space. The identical motions are executed in relation to a moving space as a result of offset information supplied to the converter by a servolink to the conveyor. The converter automatically changes the angles of elevation and azimuth of the arm, and its length, as needed, either for keeping the workhead in constant cooperation with a point in space that moves with the conveyor, or for enabling the workhead to keep pace with the advancing pattern of points that are involved in the program.

In a second embodiment the program control information is provided directly to each control for the actuators that tilt, swing and extend the arm which carries the workhead. A converter is provided that has a linear input control operated by a servolink to a conveyor, and the lever of the converter operates controls that introduce an appropriate offset into each of the actuator controls of the arm for keeping the workhead on the arm in step with a point or a pattern of points on the conveyor.

The nature of the invention in its various aspects is more readily understood and appreciated from the following detailed description of the illustrative apparatus shown in the accompanying drawings.

In the drawings:

FIG. 1 is the lateral elevation of an article-handling apparatus shown partly in cross section and showing in broken lines a position assumed by one of its parts in the course of operation;

FIG. 1A is an enlarged cross section of part of the apparatus of FIG. 1 as viewed from the plane 1A—1A in FIG. 1;

FIG. 2 is a top plan view of the apparatus of FIG. 1, showing in broken lines a position assumed by part of the apparatus in the course of its operation;

FIG. 3 is an enlarged lateral cross section of a detail in FIG. 1, viewed from a vertical plane at right angles to FIG. 1;

FIG. 4 is an enlarged view of part of the control structure in units 86 and 88 of FIG. 2;

FIGS. 4A, 4B and 4C are modifications of the control apparatus of FIG. 4;

FIG. 5 is a block diagram showing the coordinating and program control apparatus for the apparatus of FIGS. 1 and 2;

FIG. 6 is a somewhat diagrammatic lateral elevation of the apparatus of FIGS. 1—4, modified to include further features of the invention;

FIG. 6A is a diagram illustrating a manner of operation of the apparatus of FIG. 6;

FIG. 7 is the plan view, partly in cross section, of the converter in FIG. 6;

FIG. 8 is an end view of the converter of FIG. 7;

FIG. 9 is a top plan view of a detail of the converter of FIG. 8;

FIG. 10 is a perspective of a pallet loaded with cartons with which the apparatus of FIGS. 6—9 is useful;

FIG. 11 is a diagram of a portion of the control mechanism useful in the embodiment of FIG. 7 to enable alternate operation of the apparatus with "offset" for synchronized operation with the conveyor and for elimination of such "offset;"

FIG. 13 is the elevation of part of the apparatus in FIG. 12, drawn to somewhat larger scale;

FIG. 14 is a plan cross section of the apparatus in FIG. 13 as viewed from the section line 14—14;

FIG. 15 is a fragmentary perspective of the apparatus of FIGS. 13 and 14, in a modified operating state; and FIG. 16 is a detail of a portion of the control apparatus linking the converter of FIGS. 13—15 with the rest of the apparatus in FIG. 12.

Figure 12:
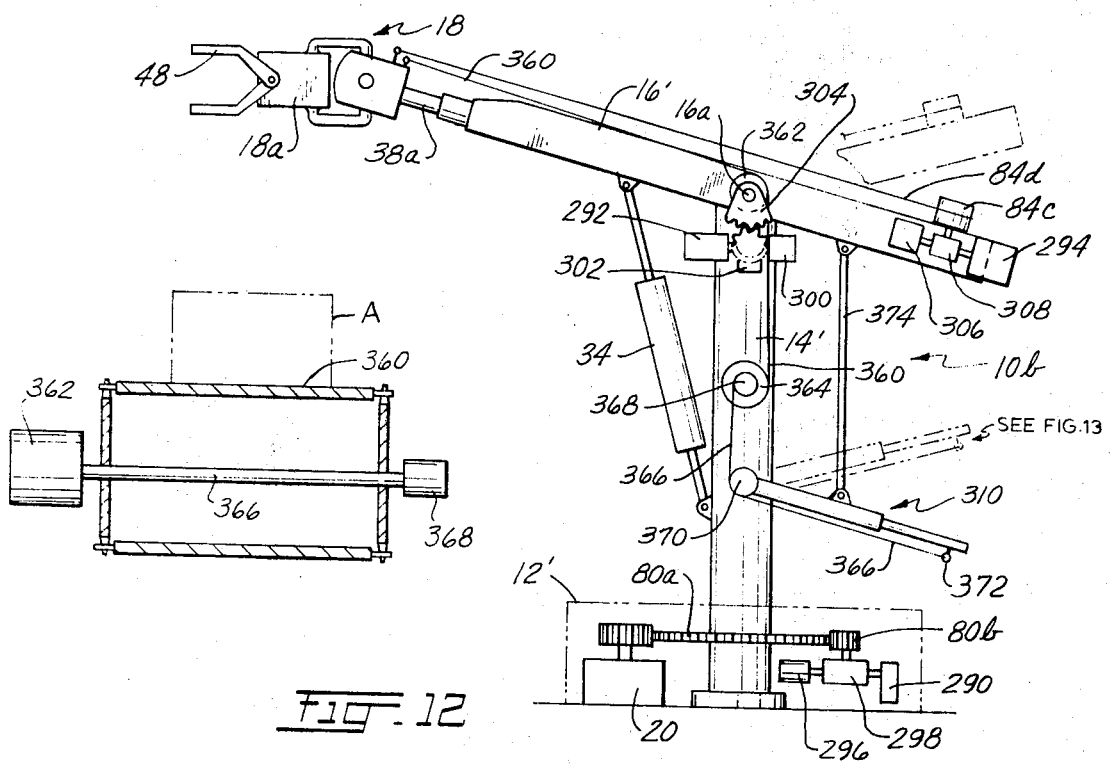
FIG. 12 is a lateral somewhat diagrammatic view of apparatus as shown in FIGS. 1—4 modified to include certain additional features of the invention.

Referring now to FIGS. 1, 1A, 2 and 2A, an article transfer apparatus 10 is shown including a base 12, a vertical post 14, and an arm 16 carrying head unit 18. Base 12 contains a drive motor 20 which operates through chains 22 to rotate the center shaft 24 of post 14 about its vertical axis. Shaft 24 rotates within a stationary sleeve 26 on base 12, and is supported for rotation by bearings 28 and 30. A shell 32 is secured to shaft 24 above bearing 28, and rotates with the shaft.

Hydraulic actuator 34 (which may be simply a piston operating in a cylinder with hydraulic lines to its extremities) has a pivotal connection 34a to rotary shell 32, and actuator 34 is connected by rod 34b to arm 16. By proper control of the pressure supply of hydraulic fluid to the respective ends of actuator 34, rod 34b will elevate or lower arm 16 about its pivot 16a, as desired, or hold the arm at any angle of elevation.

Arm 16 contains hydraulic actuator 38 comprising piston rod 38a and piston 38b, the cylinder in which piston 38b works being secured to arm 16 and rod 38a being secured to head unit 18. Radial motion of head unit 18 is controlled by admitting hydraulic fluid under pressure to the appropriate side of piston 38b, discharging fluid from the other side of the piston. Two tubes 36a and 36b are telescopically received in tubes 36c and 36d and support head unit 18. Shafts in tubes 36a and 36b have telescopic splined connections to drive shafts 50' and 68, respectively. These two telescopic drive shafts cause a swinging motion of workhead 18a about the axis of shaft 18d and tilting motion about the horizontal axis of shaft 18c. These axes intersect with each other at a point along the axis of rod 38a which may be called the longitudinal axis of arm 16. The axis of rod 38a passes through the axis of pivot 16a, which is the pivotal axis of arm 16. The telescopic shafts maintain the described drive connections throughout the range of radial motion of head unit 18 produced by actuator 38. Shaft 18c remains horizontal and parallel to pivot 16a. Shaft 18d can tilt, but it can also be made vertical and parallel to post 14 despite sloping positions of arm 16.

Horizontal shaft 18c has its extremities in bearings in U-shaped head frame 18b and is rotated by the shaft in tube 36a via bevel gears 40. Shaft 18d operates in tube 18f that is united to shaft 18c. Rotation of shaft 18c about its horizontal axis causes tilting of shaft 18d.

The drive shaft in tube 36b operates bevel gear 42 for rotating a bevel gear unit comprising bevel gears 44a and 44b united to the ends of a sleeve 44d that forms a bearing on shaft 18c. Bevel gear 44c meshes with bevel gear 44b, and because gear 44c is fixed to shaft 18d, rotation of the drive shaft in tube 36b causes swinging of workhead 18a about its shaft 18d.

A yoke 18e is secured to the ends of shaft 18d and to gear 44c. Yoke 18e swings through a large arc and, if necessary, yoke 18e may be made large enough to swing about the gear-containing portion of head unit 18. At the end of yoke 18e remote from arm 16 there is a drive unit 46 carrying article-gripping jaws 48. Drive unit 46 can be arranged to rotate jaws 48 about an axis passing through the intersection of the axes of shafts 18c and 18d. Unit 46 contains suitable means (not shown) for operating the jaws to grip and release an article.

When equipped with jaws 48, apparatus 10 is operable for transferring articles from place to place as desired. Jaws 48 may be replaced by a suction cup as another form of article gripper. Other devices such as a drill, a pair of welding jaws, and other work devices may be mounted on unit 46 in place of jaws 48. Still further, unit 46 may itself contain a driving element for shifting jaws 48 or a substitute tool along the axis of rotary drive unit 46. Such endwise motion is useful, for example, for causing lengthwise drive of a drill carried by unit 46.

The apparatus thus far described involves a number of independent motions, each of which may be termed a degree of freedom. Post 14 is rotatable by motor 20 about a vertical axis for operating arm 16 through various angles of azimuth. Actuator 34 operates arm 16 through a range of angles of elevation. Operation of actuator 38 shifts head 18 radially. These may be termed three primary degrees of freedom. In addition, the swinging motion of workhead 18a about its axis 18d and the tilting motion of workhead 18a about its horizontal axis provide two secondary degrees of freedom. Rotation of unit 46 about its axis represents a sixth degree of freedom. Another degree of freedom would be represented by the shift of jaws 48 bodily along the axis of unit 46.

The following means is provided for rotating the shaft in tube 36b, in order to swing yoke 18e about the axis of shaft 18d. Shaft 50 is coupled to gear 42 through differential 79 and shaft 50' via internal telescopic splined shafts. Shaft 50 is rotated by bevel gears 52 and 54, the latter gear being operated by dual sprocket 56, chains 58 and by a reverse-acting pair of hydraulic actuators 60. Each of these actuators provides a power stroke in the direction to pull the related end of chain 58, thereby to rotate sprocket 56 and gears 54 and 52.

Gears 40 are driven via splined shafts in arm 16 extending to shaft 68 at the opposite end of arm 16. Shaft 68 is rotated by bevel gears 70 and 72, a dual sprocket 74, chains 76 and dual hydraulic cylinder actuators 78, the construction and operation of which is the same as that described for hydraulic cylinders 60 and 62 and the parts driven thereby.

Any rotation of shaft 68 causes shaft 18c to rotate about its horizontal axis and thereby causes shaft 18d to tilt. However, if this occurs at a time when bevel gear 42 is fixed, thereby fixing bevel gears 44a, 44b, and 44c, then the tilting of shaft 18d would result in travel of bevel gear 44c about gear 44b, and would inherently cause yoke 18e to swing about tilting shaft 18d. This is avoided here by providing a differential gear unit 79 having input couplings from both shaft 68 and shaft 60 and having its output shaft coupled to gear 42. In case shaft 68 should not rotate, any rotation of shaft 50 would be transmitted via the differential gear assembly 79 to gear 42. This would cause rotation of bevel gears 42, 44a, 44b and 44c, and would cause swinging of head 18a about vertical shaft 18d. On the other hand, in case shaft 68 should rotate when shaft 50 does not rotate, then shaft 68 would cause not only rotation of gears 40 for rotating shaft 18c to tilt head 18a, but, additionally, differential gearing 79 would provide a compensating rotation for gear 42 to avoid unintentional swinging of head 18a about the tilting axis of shaft 18d.

Apparatus 10 includes a power actuator in each degree of freedom, and is program-controlled in each degree of freedom. In the form illustrated, rotatable shaft 24 of post 14 is operated by motor 20 and carries a gear 80a that meshes with gear 80b to operate unit 80c. This unit contains a digital shaft-position encoder or analog-to-digital converter and other devices described below. Rotation of shaft 24 by motor 20 is monitored by the digital encoder, and can be interrupted or otherwise controlled by the relationship in effect at any moment between the digital encoder and a control program. Motor 20 may be stopped when the encoder matches the program code, or the program code can be replaced by the next code when match occurs, as desired. Similarly, the elevation of arm 16 by actuator 34 is monitored by means of a gear sector 82a fixed to arm 16 and operable about pivot 16a. Sector 82a meshes with pinion 82b for operating device 82c. This device (described below in detail) includes a digital encoder. Still further, the radial motion of arm 16 caused by actuator 38 is monitored by a unit 84 that contains a digital encoder. Unit 84 is operated by a gear 84a driven by a pinion 84b secured to drum 84c. An internal windup spring is contained in drum 84c, and this drum is arranged to level-wind a flexible cable 84d that extends about a pulley 84e fixed to rod 38a. Cable 84d has the end thereof remote from drum 84c secured to arm 16 at pin 84f. Motion of unit 18 outward and inward carries pulley 84e outward and inward correspondingly, thus operating drum 84c via cable 84d. In this way, the encoder in unit 84 represents the absolute position of head 18, radially, and can be used to control the valves of actuator 38 for arresting head 18 at any desired radial position.

Units 86 and 88 geared to shafts 50 and 68 similarly contain digital encoders to represent the absolute positions of shafts 18c and 18d about their respective axes, for adapting the apparatus to program control. Details of these units appear below.

Each of the motions described is ordinarily subject to independent program control. However, it is sometimes desirable to link certain motions. For example, jaws 48 may grip an article in what may be called a normal attitude, and it may be important for this attitude to be maintained despite a change in the angle of elevation of arm 16 to the broken line position 18' in FIG. 1. Correspondingly, it may be desirable to maintain the attitude of an article in jaws 48 unchanged, despite the swing of arm 16 about the vertical axis of post 14 in carrying head 18 to its broken line position 18'' (FIG. 2). The axis of unit 46 and jaws 48 remains parallel to its initial position in this parallel-mode type of operation despite the changed angle of azimuth or elevation or both of arm 16. For this purpose, units 82c and 88 are coordinated, and units 80c and 86 are coordinated.

Unit 82c is shown in FIG. 3. Within unit 82c there is an analog-to-digital encoder 90 that is connected directly by shaft 92 to pinion 82b. Encoder 90 may, for example, be of the form in U.S. Pat. application Ser. No. 494,524, filed on Oct. 11, 1965, by G. H. Leonard. A gear 94 is normally freely rotatable on shaft 92. A magnetic clutch 96 has one plate fixed to gear 94 and another plate fixed to shaft 92. The clutch, when energized, couples gear 94 to shaft 92. When this occurs, gear 94 drives pinion 98, and rotates a servo master control, for example synchrotorque transmitter 100. When clutch 96 is deenergized, then a spring 102 becomes effective to restore the rotor of synchrotransmitter 100 to a normal starting angular position.

Unit 80c is like unit 82c, in that unit 80c contains both a digital encoder and an optionally operative synchrotorque transmitter.

Units 86 and 88 are made alike, for example as shown in FIG. 4.

Plate 103 supports analog-to-digital encoder 104 of the same construction as encoder 90, and a servo slave unit such as a synchrotorque receiver 108. Encoder 104 is coupled by gearing 105 to one shaft of differential gearing unit 107. Another shaft of the differential gearing unit 107 is connected to synchroreceiver 108. The third shaft 112 of the differential gearing unit is connected to sprocket 56 or sprocket 74, where the unit shown in FIG. 4 is used as unit 86 or 88 in FIGS. 1 and 2.

So long as synchroreceiver 108 is held in what may be called its "zero" position, the position of shaft 112 corresponds to the code output of encoder 104. Rotation of synchroreceiver 104 introduces an offset in that relationship. The offset angle as measured at shaft 112 is made equal and opposite to the angle through which synchrotranmitter 100 is operated from the start to the end of a program-controlled angular motion of arm 16, provided that there is no change in the value against which encoder 104 is compared and matched. The change thus introduced means that there is no longer the original relationship between the position of the operated part of the apparatus and the value represented by the related encoder. During an offset operation of this type, arm 16 changes its angle of elevation, but workhead 18a remains parallel to its original position at the start of the change-of-elevation travel of the arm 16, by reversely changing its angular relationship to arm 16.

A spring mechanism biases servoreceiver 108 to a "zero" or "home" position. In that state, there is an absolute relationship between the code produced in encoder 104 and the position of the component to which the encoder is geared. Thus, with servoreceiver 108 in its "home" position and with shaft 112 coupled to sprocket 56, the angular position of workhead 18a about shaft 18d is digitally represented by the code output of encoder 104. This spring mechanism includes a pair of torsion spring units 109 and 111 having the outer ends of internal wound leaf springs fixed to their cases and having the inner ends of the springs fixed to arms 109a and 111a on respective shafts at the centers of the spring cases. In the "home" position of the servoreceiver, arms 109a and 111a bear against the opposite faces of fixed stop 113, and they also bear against opposite sides of pins 115a and 115b projecting from gear 115. Gear 108a of the servoreceiver 108 meshes with gear 115.

When the servoreceiver is rotated, gear 115 forcibly lifts one of the arms 109a or 111a away from stop 103, and increases the spring tension of the related spring unit. Subsequently when the servoreceiver is deenergized, the spring reset mechanism described firmly returns the operated arm 109a or 111a into contact with stop 103, thereby restoring the servoreceiver 108 to its "home" position.

A modification of the apparatus of FIG. 4 is shown in FIG. 4A. Digital encoder 104 in FIG. 4A is shown mounted on plate 106, which also supports synchrotorque receiver 108. Units 104 and 108 in FIG. 4A have input shafts to differential gear assembly 110 for operating shaft 112, as in FIG. 4. This shaft represents the shaft of sprocket 56 or sprocket 74 (FIGS. 1 and 2).

A precise arrangement is provided for returning servo 108 to "zero." For this purpose, synchrotorque receiver 108 operates an assembly 114 of disks that are coupled together in the manner of odometer wheels so that the disk closest to synchroreceiver 108 operates at highest speed and the others are scaled down to index one step for each ten, hundred, and thousand rotations of the "units" disk 114a. As shown in broken line end view in FIG. 4, the disks are generally round but have a flat, and all of the flats are aligned horizontally when unit 108 is in its normal "zero" position.

Cooperating with all of the disks of assembly 114 is a pair of normally open contacts 116 (shown in broken lines 116') that are closed so long as any one of the disks is out of its "zero" position. Contacts 118 and 120 are normally open, and either of these contacts closes when the flat portion of "units" disk 114a rotates through a significant angle away from its "zero" position. The adjustment of contacts 116 in relation to contacts 118 and 120 is such that, upon rotation of disk 114a in either direction, contacts 116 close after the closing of one of two pairs of contacts 118 or 120, depending upon the direction of rotation of disk 114a.

Closing of contacts 116 and 120 occurs when disk 114a rotates counterclockwise, considering the end view representation 114a' in FIG. 4A. When this occurs, power is connected from line 122, contacts 120 and relay contacts 124a to relay 126 and to terminal 122'. When this occurs, relay 126 is energized and closes its own holding contacts 126b which maintain relay 126 energized via line 128 so long as contacts 116 remain closed. When relay 126 has once been energized, its contacts 126a open and thereby break the circuit from contacts 116 via contacts 118 that might otherwise be established to relay 124. Consequently, continued rotation of disk 114a in a counterclockwise direction, ultimately allowing contacts 118 to close, would not cause energization of relay 124. On the other hand, if disk 114 should rotate clockwise, thereby closing both contacts 116 and 118 initially, then a series circuit is formed from line 122 through contacts 116 and 126a to relay 124 and terminal 122'. This has the effect of closing its holding contacts 124b, thereby maintaining relay 124 energized so long as contacts 116 remain closed. Energization of relay 124 also opens contacts 124a and thereby prevents subsequent energization of relay 126 when contacts 120 close later in the continued rotation of disk 114a. Thus, either relay 124 or relay 126 is energized, depending upon the direction of rotation of disk 114a away from its "zero" position and the selected relay remains energized so long as any one of the disks in assembly 114 in its "zero" position. On the other hand, when all of the disks are restored to their " zero" position by restoring synchroreceiver 108, contacts 116 open, and then the energizing connection for the holding contact circuits is broken and the energized relay is deenergized.

Relay 124 has a pair of contacts 124c which, when closed, operate a reversing relay 130. Normally, reversing switch 130 provides an energizing connection from a signal source 132 via contacts 134a of relay 134 when closed. At that time, and if reversing switch 130 is then in its normal condition, then synchroreceiver 108 rotates in a first direction. In case contacts 124c should be closed when closing of contacts 134a occurs, then synchroreceiver 108 rotates in the opposite direction.

Relay 134 can be energized by closing its control contacts 138 momentarily. When this is done, relay holding contacts 134b are closed, to complete a holding circuit via lead 128 through contacts 116 to energizing terminal 122. So long as the synchroreceiver is in its "home" position, contacts 116 are open and relay holding contacts 134b cannot energize relay 134.

A further modification of the apparatus of FIG. 4 is shown in FIG. 4B. Here the case 104' of a digital encoder (in all respects like encoder 104) has its frame or housing mounted for rotation with shaft 112' that corresponds to shaft 112 in FIG. 4. The movable shaft 140 of the encoder is coupled by gears 142 to synchrotorque receiver 108 whose case is stationary. Gear 108a couples the synchrotorque receiver to gear 115, this being part of a torsion spring restoring mechanism exactly the same as in FIG. 4.

The operation of the apparatus in FIG. 3 and each of FIGS. 4, 4A and 4B may now be described, in their relationship to the equipment of FIGS. 1 and 2. The apparatus of FIG. 3 is contained in each of units 80c and 82c of FIG. 1, and any one of the assemblies in FIGS. 4, 4A or 4B is contained in units 86 and 88. It may be assumed that the apparatus has been programmed so that work head 46 is horizontal and jaws 48 grip an article in its horizontal attitude. Shafts 16a and 18c are parallel to each other. Arm 16 is initially horizontal or at any other angle of elevation. Let it be assumed further that it is desired to maintain jaws 48 horizontal despite swinging of arm 16 through a substantial vertical angle for raising or lowering the article. The horizontal attitude of the article shall not change during this operation. (The assumption that workhead 46 is horizontal is only an example of its possible attitudes in the ensuing operations.)

At the start of the operation, clutch 96 (FIG. 3) is energized under program control. Any rotation of gear sector 82a representing the change in the program-controlled elevation of arm 16 causes rotation of pinion 82b and gears 94 and 98 so as to operate synchrotransmitter 100. This has the effect of correspondingly rotating synchroreceiver 108. A program-controlled motion of arm 16 through a vertical angle would cause a corresponding angular motion of jaws 48 when there is no change in the code that is supplied to control the jaws. Stated otherwise, if jaws 48 were aligned with arm 16 and if arm 16 changes its angle of elevation, jaws 48 ordinarily move through the same angle, still aligned with arm 16—assuming the same control code is supplied to the head motion control at the start and end of this motion. However, rotation of synchroreceiver 108 introduces a differential effect between digital encoder 104 and the tilt control drive of head 18a. This causes hydraulic actuator 78 to operate for maintaining encoder 104 in condition to match the program instruction. As a result, shaft 112 operates in such direction as to compensate for the changed attitude of arm 116 and maintain constant the attitude of jaws 48 and the article carried by those jaws.

The same effect is realized in relation to the horizontal swing of arm 116 from the initial position in FIG. 2 to that represented by the broken line position 18''. Consequently, despite controlled motions of arm 16 in both azimuth and elevation angles, it is possible to maintain constant the attitude of the article gripped between jaws 48. At the start of such "parallel-motion" mode of operation of workhead 18, shaft 18c is inherently parallel to shaft 16a. Shaft 18d should be made parallel to post 14 where azimuth parallel-motion operations are to be executed. Jaws 48 can be mounted so as to be capable of tilting on workhead 18, if desired, so that requiring shaft 18d to be vertical in the parallel-motion mode of operation is not a serious handicap.

It is important that the initial absolute digital program control over the positions of shafts 18c and 18d be restorable, following a parallel-motion mode of operation, to undo the offsetting effect of the synchrotransmitter and receiver (or other servomaster and servoslave) just described. For this purpose, it is necessary to restore the synchroreceiver 103 to its "zero" condition, thereby reestablishing the initial relationship between each encoder 104 in units 86 and 88 and shaft 112. This is done in FIG. 4 and 4B by deenergizing the synchroreceiver so that spring 109 or 111 operates. In FIG. 4A this is done by momentarily closing contacts 138, thereby energizing relay 134 and closing contacts 134a. This applies a restoring motion signal to synchroreceiver 108, which operates in the correct direction as previously described for restoring the assembly of disks 114 to the true "zero" condition. When that condition is reached, contacts 116 open, relay 134 is deenergized, and operation of synchroreceiver 108 is arrested. It is also desirable to restore synchrotransmitter 100 to its normal angular position. This restoration is effected simply by tension spring 102, clutch 96 being deenergized at this time.

The arrangements in FIGS. 4 and 4A involve a differential gear assembly 107 or 110. This is a complication, but has the advantage of modifying the effect of digital encoder 104 without bodily rotating the frame of the encoder. Inasmuch as many wires are often involved in the typical encoder, fixed mounting of the encoder is an advantage because it avoids the use of troublesome sliprings for providing connections to the encoder. However, there are some forms of encoders where this condition is not of controlling importance; and in that event, the configuration of parts in the encoder and the offset means in FIG. 4B may be desirable. A still further alternative may be desired, interchanging encoder 104' and synchrotorque transmitter 108 in FIG. 4B, thereby mounting the housing of the encoder fixedly and mounting the housing of the offset-introducing synchro receiver on rotating shaft 140. This is shown and more fully described in an application filed concurrently herewith by George C. Devol.

FIG. 4C shows a still further approach to the problem of achieving a parallel-motion mode of operation, for maintaining constant aim of workhead 18a despite changes in the angle of elevation of arm 16. Identical apparatus is useful for maintaining constant aim of workhead 18a despite angular motion of arm 16 about post 14, where shaft 18d is vertical at the start of the parallel-motion mode of operation. Actuator 34 in FIG. 4C is controlled by encoder 90, program input unit 90a, and a comparator 90b in which the difference between the encoder and the program instruction is derived. Comparator 90b controls a valve 34a to cause operation of actuator 34 in the appropriate direction in dependence on the algebraic sign of the difference, and to shut the valve when the difference reaches zero. This is the normal control means for the elevation of arm 16. An example of such control is shown in U.S. Pat. No. 2,927,258 issued to B. Lippel. Actuator 60 provides the drive effort to tilt head 18a. Valve 60a controls actuator 60. Program input unit 104a supplies the usual input control for the tilt motion of workhead 18a, to be compared with the encoder 104 that monitors the tilt position. Comparator 104b provides output for controlling the valve 60a. Comparator 104b responds to input values from the encoder and the program input unit, and provides an output representing the difference, so as to operate actuator 60 in the appropriate direction and to shut valve 60a when the input values are alike.

In FIG. 4C, a numerical combining unit 108' is included to introduce a parallel-motion offset, comparable to the effect of synchroreceiver 108. When switching means 108b is closed, register and added 108' takes the algebraic sum of the output of encoder 104 and the numerical difference or the number of pulses needed to reduce to zero the difference between encoder 90 which represents the initial elevation of arm 16 and program unit 90a which represents the final elevation of arm 16 at the end of the motion to be executed. Adder 108' supplies this algebraic sum to comparator 104b with its algebraic sign reversed, to be compared with the program input. Assuming this to be a parallel-motion mode of operation, the program input from unit 104a does not change, and actuator 60 causes an angular tilt motion of workhead 18a that is equal and opposite to the change-of-elevation motion of arm 16 to be carried out or being carried out by actuator 34. Succeeding operations of arm 16 by its actuator 34 and of workhead 18a by its tilt actuator 60 in the parallel-motion mode are carried out in the same way.

At the end of a parallel-motion mode of one operation or a series of such operations, the absolute relationship between encoder 104 and tilt actuator 60 is to be restored. This is executed by opening switching means 108b and actuating reset element 108a' to restore to zero the input register in unit 108' that stores input from comparator 90b. Thereafter, absolute position input data from program unit 104a has its original significance in controlling the aim of workhead 18a, not altered by unit 108'.

The apparatus involving digital encoders 90 and 104 as well as digital encoders for other degrees of freedom in the apparatus described represents a highly reliable form of program-controlled equipment, in which there is an absolute position for each numerical instruction for each degree of freedom. The program as established is repeatable reliably on a point-to-point basis, free of errors such as might be introduced in other forms of program control. In another form of program control, the motion in any one degree of freedom from one point to the next is established by counting the number of steps of advance. Each new position is established as an increment in relation to the previous position. In such a system there is a possibility of errors arising due to spurious pulses and due to pulses being lost, a cumulative source of error, and therefore the absolute coordinate system as described in the preferred type of control. However, it will be readily recognized that the parallel-motion controls 100 and 108 in FIGS. 3 and 4 and the circuit of FIG. 4C can readily be used or adapted with the well-known incremental point-to-point control system, and with other forms of program-controlled motions.

The extent of motion in each degree of freedom when carried out under program control in each respective degree of freedom may be called a "program-controlled motion." The parallel-motion mode of operation is brought into effect under program control, as by energizing clutch 96 (FIG. 3), or by closing switching means 108b for rendering added 108' operative. It represents a program-controlled mode of operation and it is another "program-controlled motion." There is a tying together of two degrees of freedom wherein control of a primary degree of freedom causes movement through a program-controlled arc while the linked degree of freedom moves through an incremental arc from its initial position. When the parallel-motion mode is in operation, the primary control such as elevation of arm 16 is linked to a related degree of freedom such as tilt of head unit 18a. The latter is a dependent degree of freedom during the parallel-motion mode. The secondary motions of workhead 18a are equal and opposite to the primary motions of arm 16 in the parallel-motion mode of operation.

It will be appreciated that program control signals in FIG. 4C that control the operation of arm-tilting actuator 34 are also used, inversely, to control the workhead tilting actuator 50. Stated otherwise, there is no need for a separate program of signals for tilting the workhead in the parallel-motion mode of operation, since the signals that control the arm elevation are used also to control the attitude of workhead 18a. This kind of operation of the apparatus in FIG. 4C is applicable not only when the whole apparatus is being operated under program control, but also during the preparatory phase, when the program is being recorded, an operation more fully described below in connection with FIG. 5. In that case, the values in encoders 90 and 104 at the start of the parallel-motion mode of operation are entered in intermediate storage registers forming part of program units 90a and 104a. Thereafter, during the time when actuator 34 is being operated by valve 34a under manual control to "teach" a motion sequence by recording the manually controlled motions, the numerical changes produced by encoder 90 are derived by comparator 90b and used (with reversed sign) to control the operation of valve 60a as already described.

This kind of operation is a distinct advantage, since the automatic parallel-motion of operation thus realized avoids the burden of manually controlling the attitude of workhead 18a during the program-recording operations.

FIG. 5 is a simplified illustration of a form of program-control equipment suitable for the apparatus of FIG. 1. This includes a rotary drum 146 having a surface of readily magnetizable and magnetically retentive material. This drum may be either a continuously rotating type of storage drum, or it may be a form of magnetic drum that indexes from one control position to the next. The drum as shown is equipped with a first set of magnetic sensing or "read" heads 148 and another set of magnetizing or "write" heads 150, but it will be understood that a single series of heads can readily be utilized for both sensing and recording. The control areas that are sensed at any one moment by the series of heads 148 may be called a "slot" while the series of areas sensed in succession by any one of the heads 148 is called a "track." Heads 148 are divided into as many groups as there are degrees of freedom, plus a few hands that are allocated to controlling various special functions involved in the apparatus of FIG. 1. The code combinations sensed by a typical group 148a of sensing heads is temporarily stored in unit 152. Information as to the actual position of the controlled actuator in the related degree of freedom is provided by digital encoder 154, typical of the several encoders in the equipment of FIG. 1 such as encoder 90 (FIG. 3) and encoder 104 (FIG. 4). The difference between the coded numerical representation provided by sensing heads 148a and the position of actuated part of the apparatus, such as the elevation of arm 16 by actuator 34 as represented by encoder 154, is derived by means of subtraction unit 156. The operation control means 158 of the actuator in each degree of freedom is controlled by unit 156. Advantageously, unit 156 provides not only the "on" and "off" control but also the direction of operation, corresponding to the algebraic sign or sense of the difference between the values applied to subtraction unit 156 by the temporary storage unit 152 and the digital encoder 154. The details of this digital form of control are separately well known and may take a variety of different forms as, for example, in U.S. Pat. No. 2,927,258 issued Mar. 1, 1960 to B. Lippel. Still further, the apparatus may be of a design to impart not only "on" and "off" control, and direction or sense control, but also to provide rate control so as to decelerate the operation of the controlled actuator in the related degree of freedom as the end point of the motion comes close. The magnetic memory represented by drum 146 and the related recording, sensing and code-utilizing equipment in FIG. 5 may also take a variety of other forms as in the above-mentioned Devol patents. Many other forms of control may also be utilized to advantage. In the illustrated apparatus, when the subtraction shows that there is correspondence between the temporary storage and the sensed coordinate for which the apparatus of FIG. 1 has been programmed to operate, as one point in the series that make up the program of motions, the next functions or the next program step becomes effective. The controlled actuator may arrest the operated part, or motion of the actuated part may continue under control of the next slot of the program drum.

There are as many groups of heads 148 as there are degrees of freedom, as previously mentioned, group 148a being assigned to one degree of freedom, group 148b being assigned to another degree of freedom, etc. Each additional group of heads 148b is associated with a duplicate system like that described for the group of heads 148a. Additionally, there is a group of heads 148c whose purpose is to provide control functions for the apparatus. Thus, for example, at some part in the program it might be desired to institute a parallel-motion mode of operation. To do this, each synchrotransmitter 90 is connected to its receiver 108, and each clutch 96 is activated, under control of a recording sensed by a head 148c, this control 96' optionally including a temporary storage register. Reset control 157 of the register 152 that temporarily stores sensed digital codes can be rendered operative under the same control 148c to prevent the value stored in temporary storage register 152 from being changed in the sensing operations that follow. In the ensuing operation of the apparatus of FIG. 1 (when the next slot of the drum is in effect) the parallel-motion mode of operation would then come into effect. At the end of such parallel-motion mode of operation, or at the end of a sequence of such operations, another sensing head of the group 148c may provide a signal to disconnect the servotransmitters and servoreceivers, to deenergize clutches 96, and in the device of FIG. 4A, to close contacts 138, for restoring synchroreceiver 108 to its "normal" position. Concurrently this restores shaft 112 to the position corresponding to that prevailing at the start of the parallel-motion operation. Where (as here) absolute coordinates are represented by the related digital encoder, the offset introduced by the parallel-motion mode of operation is eliminated, and absolute value relationship between encoder 104 and shaft 112 is restored. The following operations in the program are controlled by the sensing heads 148a, 148b, etc.

Restoration of the synchroreceiver 108 (or its equivalent) to the starting position at the end of a parallel-motion step or series of steps in a program may well be desired even where the encoder 104 is omitted in favor of a variety of other forms of program-responsive drive controls that may not involve an encoder of absolute positions. A device for controlling or monitoring a program-controlled motion as an incremental displacement or as a discrete series of steps from the previous program-controlled position is an example of another form of control with which the parallel-motion mode of operation is useful, and still others are known.

The program on drum 146 is recorded as is discussed in greater detail in the above-identified Devol patents. Briefly, however, a new program can quickly be "taught" to the memory drum by manually controlling the apparatus of FIG. 1 to execute the desired program and, at each step of the sequence of motions that is desired, causing the coordinates of that position to be recorded. For this purpose, digital encoder 154 may be connected by switch 160 to the control circuit 162 of the related group of recording heads 150a. These heads (when energized) record the code combination represented in encoder 154, as to each step in the program, for each of the different degrees of freedom. Additionally, it is understood that appropriate manually controlled means are to be provided for causing recording heads 150c to record the necessary function control portions of the recorded program. During program-controlled operation of the apparatus, the drum-advancing means 161 operates under control of subtraction means 156 and a function control sensing head 148c, via switch 163. This switch is shifted to manual control during the "teach" activities.

The apparatus of FIGS. 1—5 inclusive represents a highly flexible type of equipment that is readily adapted to perform a variety of functions, as already mentioned. The foregoing parallel-motion mode of operation is especially important in the apparatus shown in FIGS. 6 and 12 and their related FIGS.

FIG. 6 illustrates, somewhat diagrammatically, apparatus that is broadly similar to that of FIG. 1, in that unit 10a also has a base 12, a vertical post 14 that is rotatable about its vertical axis, an arm 16 that is pivoted to move through various angles of elevation about a pivot 16a at the top of post 14, and head 18 having a workhead 18a including article-gripping jaws 48. The head and the jaws in FIG. 6 are capable of both tilting and swinging motions and have control means identical to that in FIGS. 1—5 (omitted from the drawing in FIG. 6) adapting the head to both program-controlled operation and operation in what has been called the parallel-motion mode. In FIG. 6, the actuator 34 for controlling the angle of elevation of arm 16 has a hydraulic servocontrol valve 166 that is capable of operating arm 16 up and down, decelerating the motion of the arm as each desired position is approached.

The hydraulic actuator in arm 16, such as actuator 38 in FIG. 2, is controlled by a hydraulic valve 168 in FIG. 6. A control arm 170 is operable about a pivot 172. The control end of valve 166 and its body are connected to arms 16 and 170 so as to remain parallel to post 14. Valve 166 and actuator 34 act as a hydraulic servosystem so that operation of control arm 170 is reproduced by arm 16; and the arms 16 and 170 remain parallel.

Pivot 172 is carried by a ring 174 that is supported by bearings on post 14 so as to be rotatable about the axis of post 14. A part of post 14 carries a servomaster control 192 having a control part 194 that is connected to ring 174. Motion of control arm 170 about the axis of post 14 causes master control 192 to control the servoslave motor in base 12 to rotate post 14 correspondingly. Preferably a master valve is used as control 192 with a slave hydraulic motor in base 12. Accordingly, motions of arm 170 about the axis of post 14 are reproduced by the post and by arm 16 so that arms 16 and 170 remain in a common plane that passes through the axis of the post.

A rod 175 is slidably mounted within arm 170. One end of a cable 178 is secured to the rod 38a which moves head 18 radially, in the sense of a system of motions in polar coordinates. Cable 178 extends about a pulley 180 coaxial with the pivot of arm 16. The other end of cable 178 is wound about a drum 182 that is secured to post 14, and has a bearing axis parallel to that of pulley 180. A second cable 186 has one end wound about drum 184, the latter being half the diameter of drum 182 and secured thereto. Cable 186 extends about a pulley 188 coaxial with pivot 172, and the opposite end of this cable is secured to the control portion of valve 168, the body of which is secured to rod 175. Pulley 188 is half the diameter of pulley 180. Suitable means represented by spring 190 acts on the part of valve 168 to which cable 186 is attached, for maintaining the cable under tension. For example, this spring represents a pneumatic cylinder in arm 170 whose piston is connected to rod 175 and constantly biases rod 176 toward the right in FIG. 6. Valve 168 and the radial actuator of arm 16 (see actuator 38, FIG. 2) form a hydraulic servodrive. When the valve control shaft 176 is shifted out of its normal position in relation to the body portion of the valve, then the actuator in arm 16 causes rod 38a to operate cables 178 and 186 as a feedback servoconnection in the direction to restore the normal condition between the valve body and the control part of valve 168. Movements of rod 176 along its length are accordingly reproduced as proportional movements of head 18 along arm 16.

Rod 176 represents what may be called a master lever for controlling the three valves 166, 168 and 192 that control the primary motions of elevation, azimuth and length of arm 16. A device 196 which operates in rectangular coordinates X, Y and Z, shifts master lever 176 through a series of motions corresponding exactly to the desired motions of arm 16 and head 18. The various motions within head 18 are achieved in the apparatus of FIG. 6 in exactly the same way as has been described above in connection with the apparatus of FIG. 1, and will be reviewed below.

The mechanically operated valve 166 for servoactuator 34, and the mechanically coupled master 168 with its slave actuator 38, and the mechanically actuated valve 192 and its slave motor 12 are direct and effective, but by no means unique. Thus, if the mechanical coupling between each master and slave as shown were considered objectionable, master and slave potentiometers in a bridge can be used to control the direction and operation of each of these actuator controls 166, 168 and 192, and a variety of other servos can be used between each of output points 166, 168 and 192 of the control converter 170, 196 and the respective controls for the actuators that operate apparatus 12, 14 and 18.

The details of apparatus 196 are shown in FIGS. 7, 8 and 9. Unit 196 comprises a pair of rails 200 which slidably support bearing members 202 and 202a of a bridge bar 204. The oppositely extending ends of hydraulic actuator 206 operate a chain 208 that extends about sprockets 210 and 212. These sprockets are secured to shafts 214 and 216 which carry pairs of sprockets 218 and 220 that are twice the diameter of sprockets 210 and 212. A pair of chains 222 extend about respective pairs of sprockets 218 and 220, each chain 22 having its opposite extremities secured to bridge bar 204. Accordingly, motion of chain 208 by hydraulic actuator 206 is effective to shift bridge bar 204 along rails 200. "X" digital encoder 224 and synchroreceiver 226 are coupled by differential gear unit 228 to shaft 216.

At the left in FIGS. 7 and 8, shaft 230 extending parallel to rails 200 is longitudinally grooved or splined and has suitable end bearings for rotatably supporting the shaft. Shaft 230 is coupled to shaft position encoder 232 and to drive motor 234 by suitable gearing. Sprocket 236 has lateral bearings in bridge bar 204 and is slidable along shaft 230. Sprocket 236 is internally keyed so as to be rotated by shaft 230. A chain 238 driven by sprocket 236 and extending about sprocket 240 has its extremities fixed to a block 242 that has slide bearings for operation along bar 204. Accordingly, operation of motor 234 is effective to shift block 242 horizontally along bar 204, and the position of bar 242 along bar 204 is monitored by digital encoder 232.

At the right in FIGS. 7 and 8, a further shaft 244 extending parallel to rails 200 is longitudinally grooved or splined and has rotary end bearings. Shaft 244 is rotated by motor 246 and the angular position of shaft 244 is monitored by an analog-to-digital converter or encoder 248. An additional splined shaft 250 parallel to bridge bar 204 has its ends suitably supported in bearings on bridge bar 204. Shafts 244 and 250 are coupled by bevel gearing 252. A pinion 254 having lateral bearings in block 242 is slidable along shaft 250 and is internally keyed so as to be rotated by splined shaft 250. Pinion 254 meshes with a vertical rack 256 that is accurately slidable in block 242.

It will be understood that in all of the foregoing drive couplings in FIGS. 7 and 8, due precautions will be observed for avoiding looseness or backlash at the gearing and for assuring accurately controlled sliding motion free of looseness where this is needed.

At the top of rack 256 there is a rotatably mounted collar 258, and the forked end of master lever 176 (see FIG. 6) has snug-fitting bearings in collar 158. Motors 206, 234 and 246 move rack 256 along X, Y and Z coordinates, and correspondingly move the operating end of master lever 176 of the apparatus in FIG. 6. The position of rack 256 in each of these coordinates is monitored by respective digital encoders 224, 232 and 248.

The master lever 170 and its associated cable 186 and its pulley 188 and its windup drum 186 and all accurately made to half-scale that of arm 16–38a, pulley 180 and windup drum 82. To complete the symmetry between arm 16–38a and master lever 170–176, the distance between pivots 16a and the axis of these drums is twice the distance between pivot 172 and the axis of these drums. Accordingly the motions of control head 258 correspond to those of arm 16 in angles of elevation and azimuth, and the radial extent of workhead 18 remains twice that of control head 258.

It has been indicated that the apparatus of FIG. 6 is very similar, basically, to that of FIG. 1. It should therefore be understood that the servotransmitters and servoreceivers of FIG. 1 for the parallel-motion mode of operation are included in the apparatus of FIG. 6 to coordinate the swing and tilt of workhead 18a with the azimuth and elevation of arm 16, in the manner of FIGS. 1—4, 4A, 4B and 4C, omitting the digital encoders for the arm elevation and azimuth. Despite the rectangular controls used in FIG. 6 for the primary motions of the arm, the parallel-motion mode of operating workhead 18 is fully effective.

The apparatus of FIGS. 6, 7 and 8 is program-controlled by apparatus of the type shown in FIG. 5 and described above. However, while polar coordinates are used in the program for the apparatus of FIG. 1, the elevation, the azimuth, and the radial extension of head unit 18a are expressed in the program for the apparatus of FIG. 6 in terms of rectangular coordinates, i.e., digits that define the coordinates of control head 258 at the top of rack 256 and at the end of the master lever 176. The polar coordinate operating unit 12, 14, 16, etc. of FIG. 6 is controlled by master servolever 176, and this is operated by a rectangular coordinate manipulator 196 (FIGS. 7 and 8) that is program controlled.

A program can be "taught" to the program storage drum in the following manner. Head 18 can be shifted to various desired positions by controlling motors 206, 234 and 246 manually. Arm 16 responds in its basic motions of azimuth, elevation and length. When each desired position of head unit 18 is thus established, the rectangular coordinates as represented by digital encoders 224, 232 and 248 are recorded. These three coordinates may represent only part of the recording that is effective with reference to each location of head unit 18, for at each such location the other program entries may also be needed, representing related operations such as jaw-opening or jaw-closing controls, and one such recording is the start and end of the parallel-motion mode controls. If the apparatus is then changed to its automatic program-controlled mode of operation, the motions executed by head unit 18 and jaws 48 will then accurately repeat the "taught" motions under control of the drum recording. The recorded program relates to an article A (FIG. 6) that is assumed to be at rest.

In FIG. 6, workhead 18a is shown as being cooperable with an article A on a conveyor 260 which is operated by a drive motor 262 and sprockets 264 on shaft 266. A servotransmitter 268 monitors the advance of conveyor 260. During all of the recording of a program to enable head unit 18a to execute a series of operations on article A, conveyor 260 will be at rest.

The conveyor can then be started, and an article can be mounted on the conveyor at an accurately known location. At the same time, the signal generated by synchrotransmitter 268 will be coupled to synchroreceiver 226. Accordingly, the position of bridge bar 204 along its rails will be modified progressively so as to introduce a departure between the actual position of control head 258 and, correspondingly, the actual positions of those parts in the "at rest" program that is recorded on the drum. In an example, article A in FIG. 6 may represent a pallet (FIG. 10) and the jaws 48 of the apparatus in FIG. 6 may be automatically operated so as to seize, transport and discharge a succession of articles carried by the conveyor. In another example, the jaws 48 are formed as welding jaws, programmed for making a series of welds at different spots on an article carried by the conveyor; or a glue-spotting tool can replace jaws 48, and so forth. The program that was taught to the apparatus while the conveyor was at rest is modified by the offset factor introduced by servosystem 226, 268 to represent the speed of the conveyor. Of course, servomotor 226 drives bridge bar 204 along rails 200 at half the speed of the conveyor by properly proportioning the gearing that drives bridge bar 204. The program is thus executed successfully and accurately despite the motion of the conveyor that takes place while the program is being executed automatically, and despite the fact that the program was recorded with the article A at rest.

There may be no requirement for the "secondary" degrees of freedom represented by tilt and swing of workhead 18a (FIGS. 1 and 2) to be subject to independent control in the apparatus of FIG. 6. Instead workhead 18a may be constrained to a fixed attitude in space using the parallel-motion mode of operation and control means of FIGS. 1—5. In that event, the "tilt" and "swing" control recordings would remain unchanged for all motions of arm 16. These two recordings should establish a horizontal attitude of the axis of workhead 18a. The axis of the workhead as shown passes midway between jaws 48 and passes perpendicularly through shafts 18c and 18d which should be parallel to pivot 16a and post 14 of arm 16 in this operation. Workhead 18a would then move through tilt and swing angles that are equal and opposite to the elevation and azimuth angles of arm 16.

As shown in FIG. 6A, workhead 18a at the start of a motion (solid lines) moves through an angle A in reaching the final position 18a' that equals the change in elevation B of arm 16. FIG. 6A demonstrates a latitude of flexibility of the apparatus. By mounting, adjusting or operating jaws 48 movably relative to 18a so that the jaws aim down (or otherwise) while shaft 18d is parallel to post 14, the attitude of the head can be maintained constant throughout a sequence of motions in the parallel-motion mode. Thus, the apparatus is not inherently limited to the aforementioned horizontal attitude in operating workhead 18a.

The parallel-motion servos are maintained constantly in operation for this type of operation, not only during the program-controlled operation but also during the "teach" procedure of recording a control program for the apparatus. If desired, just before each program cycle of operations in the parallel-motion mode starts, the attitude of workhead 18a may be "normalized" to eliminate errors that 4. arise, i.e., in case the master and slave servos 100 and 108 (FIGS. 3 and 4) were to fall out of step. One of the heads 150c may be used to record a control for such an operation on the program of drum 146. In this normalizing operation, arm 16 is ideally perpendicular to conveyor 260 and the axis of workhead 18a is aligned with arm 16 and both are horizontal.

Synchrotransmitter 268 and synchroreceiver 226 are to be initiated in operation under program control from a starting condition at the start of the program, and they are to be restored to their starting condition at the end of the program. This is accomplished in precisely the manner as that described above in connection with FIGS. 1—5, and particularly with respect to FIG. 4. It follows that the apparatus in FIG. 6 will operate under control of a set of rectangular coordinates in the "magnetic memory" represented by drum 146 despite the essentially polar character of the apparatus 12, 14, 16 and 38. The motion of the conveyor does not introduce any changes in the recorded rectangular coordinates of the program, and yet the execution of the program by the polar apparatus takes into account all of the complex and progressive changes of azimuth, elevation and lengthwise changes of arm 16 that are necessary for jaws 48 to reach predetermined parts of an article and to keep the jaws moving in step with particular parts of an article when carried in the straight line path of the conveyor.

The coordination of the conveyor in FIG. 6 with the rest of the apparatus in that FIG. represents a distinctive feature of the invention, but this apparatus has still other advantages, apart from the conveyor. Thus, it may be desired to develop a series of pallet-loading or pallet-unloading techniques where there are many rows of articles on a pallet, many columns of articles, and many layers of articles on that pallet (FIG. 10). It would be relatively tedious to carry out the manually controlled motions of the apparatus for teaching such a program. The apparatus of FIG. 6 with its rectangular manipulator (FIGS. 7 and 8) has the distinct advantage of being able to operate during a "teach" mode by using the X, Y and Z encoders 224, 232 and 248, together with a means for executing a sequence of steps defined by successive increments introduced into a rudimentary computer. The dimensions of each carton are known, and hence center-to-center distribution of the cartons along the X axis, along the Y axis, and along the Z axis is also known. The X, Y and Z coordinates of the first carton location are readily determined by manually operating the apparatus to deposit a carton at that location. This set of coordinates can be fed into a computer, together with the three center-to-center X, Y and Z distances desired for the carton spacing within a row, for the row-to-row spacing, and for the layer-to-layer spacing, plus the number of cartons in each row, the number of rows, and the number of layers. After the first carton has been spotted physically by operating the apparatus, and the coordinates of that location are entered in the program drum 146, then the computer can supply the X, Y and Z digital coordinates to be entered into successive slots of the program drum. Each new program becomes a simple matter. Indeed, a computer can be used to record a series of programs on tape for each different grouping of articles to be palletized, and each such program can be transferred into drum 146 when needed or such tapes can even be used in lieu of such a program on drum 146 for controlling the automatic operation of the apparatus of FIGS. 6—9. Other modes of control of the elevation, azimuth and radial positions of apparatus 10 by means of the X-Y-Z control apparatus 196 can be devised for such patterned location operations such as palletizing, where X, Y and Z information of the patterned locations is available.

It may at times be important for the program-controlled apparatus to execute a program involving a number of operations on an article on a moving conveyor, and to cooperate with one or more stationary locations. Thus, for example, it may be desirable for articles at one supply point or a series of articles located at spaced-apart supply points adjacent to a conveyor to be picked up in a prescribed sequence and transferred to an article being transported on a moving conveyor, as for assembling parts to a machine being assembled while the machine base is advancing on the conveyor or for loading a pallet on the conveyor. Similarly, it may be desired to remove a series of articles from a pattern of locations within a modular area of a moving conveyor, and to transport those articles and deposit them in succession at a delivery point or in a prescribed pattern of delivery locations. Such a program can be recorded with the conveyor at rest. Under manual control, the apparatus 10a is caused to execute operations in any required sequence with respect to the article or modular area to be advanced by the conveyor, and with respect to one or more fixed locations adjacent to the conveyor. Then the automatic operation can be accomplished by having the control apparatus equipped with a means for introducing an "offset" in the program-controlled motions that are executed in relation to a moving conveyor and, for each motion that is to be executed in relation to a stationary location, to restore the program control means to the more usual form of control in which there is no such offset. This character of operation can be achieved by incorporating the structure of FIG. 11 in that of FIG. 7, as a modification of a part of FIG. 7.

The apparatus of FIG. 11 includes digital encoder 224, synchroreceiver 226, and differential gearing unit 228 that introduces an offset provided by synchroreceiver 226 between the value of encoder 224 and the position of shaft 216. A mechanism 261 is interposed between synchro receiver 226 and differential gearing 228. The purpose of mechanism 261 is to enable synchroreceiver 226 to introduce a progressive offset in proportion to the extent of motion of the conveyor from a starting time of a complete program of motions including conveyor-related motions, and to restore the program free of offset during the execution of operations not concerned with conveyor motion. In this way the apparatus can perform motions related to stationary articles and devices at stationary locations adjacent to the conveyor, and to "catch up" with a progressively advancing discrete area of the moving conveyor. The entire travel of the conveyor from start of the program is taken into account, without special concern for the time taken by the apparatus in executing program-controlled motions related to stationary locations.

Mechanism 261 includes gear 263 that is supported on a shaft 265 and meshes with the pinion 267 that provides offset input to differential gearing unit 228. A block 269 extends laterally from gear 263 and is in driving engagement with a pin 271 that extends laterally from another gear 273. This driving engagement is true for only one direction of rotation of gear 263. A torsion spring unit 275 has one end of the internal spring connected to shaft 265, and the other end of the internal spring connected to tubular shaft 277 that is rotatably supported on shaft 265. Gear 273 is fixed to shaft 277. Torsion spring unit 275 biases gears 263 and 273 in the required directions to maintain driving connection between block 269 and pin 271. Pinion 279 that meshes with gear 273 is rotated by synchroreceiver 226 in the direction to drive pin 271 away from block 269. As synchroreceiver 226 operates gear 279, gear 273 rotates and, due to torsion spring unit 275, gear 263 rotates likewise. This introduces the previously described offset into the rectangular manipulator 196 of FIGS. 6, 7 and 8 to compensate the prerecorded program for the motion of the conveyor.

Gear 263 has a pin 281 that is in engagement with a stop 283 at the start of the program. A torque motor 285 is connected to gear 263 and shaft 265 and is effective when energized to drive gear 263 so that its pin 281 bears against stop 283.

At the start of the program, synchro receiver 226 is not energized. Torque motor 285 is energized under control of the program on drum 126 (FIG. 5) to press pin 281 against stop 283, and then motor 285 is deenergized. Under program control, synchro receiver 226 is energized and starts to rotate coordinately with the travel of the conveyor. The coupling mechanism 261 is then effective to transmit the offset provided by synchroreceiver 226 to the differential gearing unit 228. Consequently, the motions of apparatus unit 12, 14, 16, etc., will execute the originally recorded program, modified to introduce the offset for compensating the program for conveyor travel. Synchroreceiver 226 continues to rotate and to rotate gear 273 during the execution of the entire program. However, if at some time in the course of the program, the apparatus unit 12, 14, 16, etc., is to execute an originally recorded program motion in relation to a fixed location alongside the conveyor, then torque motor 285 is energized under program control to restore gear 263 to its starting position. This restores the direct relationship between encoder 224 and shaft 216 that existed during recording of the program, free of any offset. When it is next desired to execute another operation in relation to the conveyor, torque motor 285 is deenergized, and the torsion provided by spring unit 275 is then effective to restore the offset corresponding to the actual conveyor advance from the start of the program. Spring unit 275 advances gear 263 to the extent limited to engagement of its block 269 with pin 271 on gear 273 that has been continuously driven by synchro receiver 226. In this way, an entire program can be prerecorded to include operations of the transfer unit which relate to stationary locations, and other operations that relate to a discrete moving section of a conveyor; and later the program can be executed automatically, with the "conveyor" operations alternating with the "stationary" operations executed by the transfer apparatus. When the mechanism of FIG. 11 is utilized, the apparatus in FIG. 5 is to include a recording head 150c and a sensing head 148c with a related circuit for controlling torque motor 285.

A further embodiment of various aspects of the invention is illustrated in FIGS. 12, 12A, and 13—16. The article-handling unit 10b of FIG. 12 includes a base 12', a post 14' that is rotatable about a vertical axis, an arm 16' that moves about a horizontal pivot 16a', and a head 18 on the end of a shaft 38a that moves head 18 to various radial lengths, measured from pivot 16a. Workhead 18a carries a pair of jaws 48. Head 18 has the same actuating means as in FIG. 1 so that the jaws can be moved through various tilting motions about a horizontal axis (parallel to pivot 16a) and various swinging motions about an axis perpendicular to the tilting axis. The same encoders and offset servoreceivers are provided in the apparatus of FIG. 12 for the swinging motion of workhead 18a and for the tilting motion of workhead 18a as in FIG. 1.

Transfer apparatus 10b is capable of being "taught" a program of motions with respect to a stationary space, e.g., the space containing an article A while at rest, and then the transfer apparatus 10b is capable of executing that program on article A when the article is carried on a moving conveyor 260 as in FIG. 6. In common with the apparatus in FIG. 1, apparatus 10b includes an azimuth angle encoder 290 which monitors the rotation of post 14' about its vertical axis, and it includes an encoder 292 that monitors the angle of elevation of arm 16', and it further includes a radial position or arm length encoder 294 that monitors the distance between pivot 16a and head 18. Motor 20 rotates post 14 about its vertical axis, actuator 34 operates arm 16' about pivot 16a, and a hydraulic actuator in arm 16' (as in FIG. 1) operates shaft 38a outward and inward, all subject to the same program control when article A is at rest as the apparatus of FIG. 1.

Apparatus 10b in FIG. 12 has an offset servoreceiver 296 that is coupled through a differential gearing unit 298 to encoder 290 and to post 14' via pinion 80b and gear 80a. Similarly, an offset servoreceiver 300 is coupled via differential gearing unit 302 to encoder 292 and to gear sector 304 that is rigidly connected to arm 16'. Finally, encoder 294 that monitors the length of arm 16'–38a is coupled to an offset servoreceiver 306 and to drum 84c (as in FIG. 1) via differential gearing unit 308. Offset servoreceivers 296, 300 and 306 are included for introducing a compensating factor that adjusts the operation of apparatus 10b for the motion of the article A on a conveyor, after the apparatus has been "taught" a program with respect to a stationary article A. These compensations will be appreciated from a consideration of FIG. 12A.

Figure 12A:
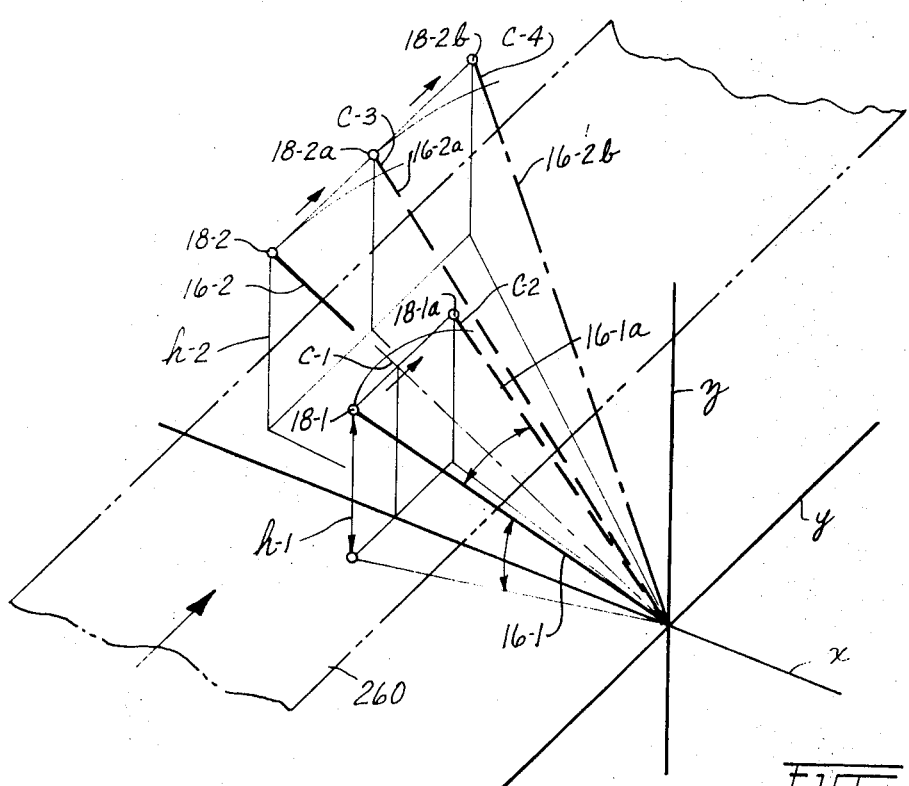
FIG. 12A is a diagram illustrating the operation of the apparatus of FIG. 12.

It is understood that a program has been recorded in the memory of the apparatus (FIG. 5) while an article was at rest on conveyor 260 (FIGS. 12 and 12A). This program involves a motion of the head 18 to position 18–1. Then there is a dwell, the article and the head remaining at rest for a time interval during the teaching of the program. The dwell may allow for a welding operation or for a drilling operation by a drill that moves outward relative to head 18, or a spot-coating operation, or the like. Subsequently, head 18 is moved to a second program-controlled position 18–2 and there another dwell is required in this illustrative program. Any further steps follow, as needed.

After the whole program has been recorded with article A at rest, the program is executed with the article on conveyor 260 which is then set in motion. The apparatus 10b moves head 18 to position 18–1 at the start of the program, with arm 16' in position 16–1. During the first dwell of the program, arm 16' moves through an angle to position 16–1a, to keep head 18 in constant position in relation to the moving article. Thereafter, instead of arm 16 carrying head 18 to position 18–2, no such motion is undertaken. This is because the "at rest" position 18–2 of head 18 has now been changed by motion of the conveyor during the "dwell". Programmed position 18–2 has now become position 18–2a. Accordingly, arm 16 should move to position 16–2a. During the second dwell, to remain in cooperation with the same part of the article represented by original coordinate 18–2, arm 16' must move from position 16–2a to position 16–2b. Prominent compensations are needed between the record-controlled positions and the program carried out in relation to the moving article.

The height of head 18 above the horizontal x, y plane (through the pivot 16a of arm 16') remains constant during the first dwell, while head 18 moves from position 18–1 to position 18–1a. This is a straight line motion, parallel to the path of conveyor 260. Initially, as arm 16–1 swings toward vertical plane x, z, arm 16'–38a becomes shorter so as to involve an arm length correction C–1. Thereafter, as head 18 moves from the x, z plane to position 18–1a, the arm length will increase to the extent of compensation C–2. (In the chosen operation, arm 16' has moved through a greater angle beyond plane x, z in reaching position 16–1a than it traversed from position 16–1 to plane x, z.) C–1 represents a decrease in arm length and C–2 represents an increase in arm length, as compared with the recorded arm length.

During the swing of arm 16' from the position 16–1 to the vertical plane x, z, there is an increase in the angle of elevation of arm 16'. This is because the radial extent of head 18 has changed, from position 18–1 to a shorter radial position and it has maintained a constant distance from the x, y plane (i.e., conveyor 260). The angle of elevation of arm 16' decreases as arm 16' moves beyond plane x, z to position 16–1a. The changes in angle of elevation to keep head 18 at the position 18–1 required by the recorded program involve further compensations.

From position 18–1a, head 18 must not move to the originally programmed position 18–2 but, instead, head 18 must move directly to position 18–2a to take into account the travel of the conveyor during the first dwell. Position 18–2 in this example is originally at the far side of plane x, z. By the time head 18 has moved to the position 18–2a (located along a straight line parallel to conveyor 260, from position 18–2) it has become necessary for the length of the arm to increase by a compensation distance C–3. The angle of elevation of head 18 has decreased a little (compared to the angle of elevation at position 18–2 of the at rest program) and of course there has been a sweep of arm 16 through a substantial azimuth angle to reach position 18–2a. Thereafter, when head 18 moves from position 18–2a to position 18–2b, there is further elongation of the arm requiring an arm length compensation C–4, compared to the original programmed arm length. There has also been a change in azimuth angle, and there has been a reduction in angle of elevation.

Mechanism 310 which is best illustrated in FIGS. 12 to 16, inclusive, provides all these compensations. This mechanism includes an arm 312 that is pivoted about axis 312' on a bracket 314 carried on a collar 316 that is coaxial with shaft 14' but rotatable on shaft 14' about the vertical axis. A companion arm 312a is similarly carried by a suitable bracket on collar 316a that is rotatable about a stationary shaft 14a parallel to post 14' but spaced laterally from that post. An arm extension 318 is telescopically received in arm 312 and, similarly, an arm extension 318a is telescopically received in arm 312a. A spherical bearing 320 fixed to shaft 322 is captive in a suitable socket in the end of arm 318. A spherical bearing 320a also fixed to shaft 322 is supported by arm extension 318a. Arms 312 and 312a are parallel to each other at all times. Balls 320 and 320a rotate in their sockets. A shaft 323 is supported by brackets 325 and 327 depending from arms 312 and 312a, spaced substantially below arm 324. Pinions 329 in these brackets mesh with rack teeth along arm extensions 318 and 318a. Shaft 323 connects pinions 329 so that both pinions rotate in unison, maintaining arm extensions 318 and 318a equal in length. Shaft 323 has a flexible or a universal rotary drive connection to each pinion 329 that accommodates angular shift of arms 312 and 312a in relation to the shaft.

A third arm 324 is carried on pivot 324' extending perpendicularly through post 14'. Arm extension 326 is received telescopically within arm 324. An externally spherical unit 328 on threaded shaft 322 is carried in a socket in extension 326, and is keyed against rotation in extension 326. In operation, parts 320, 320a and 328 pivot about axes perpendicular to shaft 322 and to their supporting arm extensions. A servoreceiver torque motor 330 is carried by shaft 322 and is arranged to operate shaft 322 in the direction to drive nut 328 away from the companion part 320. An arcuate part 330a extends from arm extension 318 to constrain the motor frame from rotating. As will be seen, the position of arm 312 and its extension 318 represents the original programmed azimuth, elevation and length of the arm, whereas the angular position of arm 324 and its extension 326 represents the actual or compensated azimuth, elevation and length of arm 16–38a.

A fourth arm 332 is supported on the horizontal pivot of arm 324. An annular plate 334 is carried by a slide bearing 335 on post 14'. Raised brackets 336 and 337 of arms 312 and 332, respectively, engage plate 334. This plate is biased against bracket 336, by gravity for example, while arm 332 is suitably biased upward so that its bracket 337 bears against plate 334. Plate 334 is thus effective to maintain arm 332 at the same angle as that assumed by arm 312. Plate 334 is spaced from arm 324 to provide clearance for arm 324 to assume larger angles of elevation than arm 312. Arm 332 carries a servotorque transmitter 338 whose rotor carries a pinion 340 meshing with a gear sector 342 carried by a bracket 344 upstanding from arm 324. The angle through which gear sector 342 operates servotransmitter 338 is a measure of the change of elevation of arm 324 relative to the programmed elevation represented by the elevation of arm 312. This change provides a compensation signal during conveyor operation, and is discussed more fully below.

An arm 345 extends rigidly from post 14 and supports a servotransmitter 346. A further arm 348 extends from bracket 316. One end of a rack or gear sector 350 is secured to bracket 348. A pinion 352 on the shaft of the servotransmitter 346 meshes with gear sector 350. When angularity develops between arms 312 and 324, as represented by their axes 312' and 324' (FIG. 15) this angularity is measured by the rotation of servotransmitter 346. The signal of servotransmitter 346 represents the azimuth compensation between the programmed position of arm 16 and its compensated position during conveyor operation.

Motor 330 is a servotorque receiver that drives nut 328 along shaft 322 in synchronism with the conveyor travel.

Arms 312 and 324 carry servotransmitters 354 and 356, respectively, e.g., synchrotorque transmitters. These servotransmitters have pinions 329 and 357 which mesh with rack teeth along extensions 318 and 326, respectively.

Referring once again to FIG. 12, a cable 360 is shown having one end secured to shaft 38a that moves with head 18. Cable 360 passes around a pulley 362 coaxial with shaft 16a, and then around a drum 364 that is mounted on post 14'. Windup drum 364 has an internal tensioner such as a torque motor to maintain cable 360 under tension. Another cable 366 is wound about a drum 368 coaxial with drum 364 and fixed thereto. Cable 366 extends about a pulley 370 that is rotatably mounted on post 14', and the remote end of cable 366 is secured to a bracket portion 372 of extension 326 (FIG. 15). An internal compression coil spring or fluid pressure cylinder in arm 324 presses extension 326 outward and maintains cable 366 tensioned.

A rod 374 (FIGS. 12 and 15) extends between arm 16' and arm 324 for maintaining these arms parallel, as to their angle of elevation. Rod 374 is parallel to post 14'.

The operation of the apparatus thus far described may be considered at this point. Servotorque receiver motor 330 on shaft 322 receives a signal from the servotorque transmitter 368 coupled to the conveyor 360, so that motor 330 rotates at a rate that represents the speed of a conveyor. Rotation of motor 330 drives arm 326 away from arm 318. The proportions of compensator 310 including its arm lengths, pulley 370, and drum 368 are all scaled down, for example, to one-half of arm 16'–38a, pulley 362 and drum 364; and the distance between pulley 370 and drum 368 is accordingly half that between pulley 362 and drum 364. Servotorque receiver motor 330 advances the end of extension 326 along threaded shaft 322 accordingly at one-half the linear speed of advance of the conveyor. The length of shaft 322 between extensions 318 and 318a is made sufficient for the apparatus to execute the programmed sequence of operations during the travel of an article on the conveyor past apparatus 10b.

The apparatus that includes motor 20 and digital encoder 290 that are coupled to the vertical post 14' tends to operate that vertical post as if the article A with which head 18 is to cooperate were not moving. However, operation of the conveyor rotates servotorque transmitter 268 and operates torque receiver motor 330 correspondingly, and as a result, an angle develops between arms 312 and 324 (FIG. 15). An equal angle develops between arms 345 and 348 (FIG. 14), with the result that servotorque transmitter 346 produces an output that is a measure of this angle. Torque transmitter 346 is coupled to servotorque receiver 296 (FIG. 12). The servosystem 346, 296, acts through differential gearing 298 to introduce an offset between the actual azimuth angle of post 14' and that which is represented by encoder 290, to an extent that accommodates the travel (at any given instant) of article A on conveyor 260 from the start of the recorded program. A suitable index element on the conveyor, or on article A, may be used to trigger the start of the programmed operation of apparatus 10b, as in U.S. Pat. No. 3,283,918.

Arms 324 and 16' are both pivoted to shaft 14', and they both swing through equal azimuth angles concurrently. The actual position of arm 16' at any given point in the program is actually the recorded azimuth angle, subject to the offset introduced by servosystem 346, 296. Accordingly, arm 312 lags arm 324 by this offset angle; and the angular position of arm 312 is, consequently, the position that arm 16 would have assumed if there had been no offset azimuth angle.

The radial length of arm 16'–38a tends to operate under program control in accordance with encoder 294. However, an offset length is introduced by servotorque receiver 306, for adjusting the radial position of head 18 in accordance with the recorded program and in accordance with the compensation or correction required to take into account the motion of the conveyor. The signal for synchrotorque receiver 306 is supplied in the following manner. The radially outward bias of the internal spring or air cylinder within arm 324 acting on extension 326 presses shaft 322 transversely, tending to move shaft 322 away from post 14'. Arms 312 and 312a are also preferably equipped with internal biasing means for urging extension 318 and 318a outward, tending to move transverse threaded shaft 322 bodily away from posts 14' and 14a. This outward bias maintains cable 366 under tension. Accordingly, the radial extent of head 18 from pivot 16a of arm 16'–38a remains proportional to the length of arm 324, 326. Servotorque transmitters 354 and 356 (FIG. 14) on arms 312 and 324 operate synchrotorque receivers 375 and 376 (FIG. 16). These synchroreceivers are connected to a differential gear unit 378 arranged to operate a synchrotorque transmitter 380 in accordance with the difference between the rotations of each synchrotorque transmitter 354 and 356. The output of synchrotorque transmitter 380 (geared down to the one-half scale of unit 310 compared to arm 16'–38a) operates synchrotorque receiver 306 (FIG. 12). Differentials 378 and 308 may be direct connected if convenient, omitting servounits 306 and 380.

So long as arm 324 and its extension 325 are face to face with arm 312 and its extension 318, then there is no difference in the rotation between servotorque transmitter 354 and 356, irrespective of the length of extension 326 as determined by cables 366 and 360. However, when servotorque receiver motor 330 operates to shift extension 326 away from extension 318 (FIG. 15) then a difference develops between the length of arm 312, 318 and arm 324, 326. This difference is derived by the servoelements in FIG. 16 and introduced by servoreceiver 306 as an offset or departure between the actual length of arm 16'–38a and the length of that arm called for by the program. This difference results from the effect of servotorque receiver 330 and represents the necessary compensation in length of arm 16'–38a, to accommodate the recorded program to the travel of the conveyor.

The angle of elevation of arm 16' is that produced by actuator 34 under control of the stored program and elevation angle encoder 292. It will be recalled that link 374 constrains arm 324 to remain parallel to arm 16'. When servotorque receiver motor 330 operates shaft 322 and causes arm 324 to swing away from arm 312, the angle of elevation of arm 324 changes in relation to that of arm 312. Arm 312 remains at a position corresponding to the actually recorded program. The net effect of the angular movement of arm 324 relatively away from arm 312 results in arm 332 moving through an angle in relation to arm 324. This motion operates servotorque transmitter 338 to transmit an elevation compensating signal to servotorque receiver 300, thereby to adjust the angle of elevation of arm 16'–38a as it moves through the various program-controlled motions for coordination with the conveyor as illustrated in FIG. 12A.

In FIGS. 12—15, each of the primary program-controlled motions involves a mechanical feedback connection between the transfer apparatus 10b and its compensation signal generator mechanism 310. Arm 324 is carried on a pivot transverse to post 14' and parallel to pivot 16a. Bracket 345 is fixed to post 14' and carries a servotorque transmitter 346 that is rotated by gear sector 350 on a bracket 348, for providing the azimuth angular compensating transmission. Bracket 345 thus represents a direct feedback connection to mechanism 310 from the controlled part of apparatus 10b. Cables 360 and 366 form a mechanical feedback connection between arm 16'–38a of the apparatus 10b and arm 324, 326 of the compensation mechanism 310. This operates servodevices 375 and 376 (FIG. 14) and 380 (FIG. 16) to provide the radial arm length compensating transmission. Finally, rod 374 provides a mechanical feedback connection to maintain parallelism between arm 16' of apparatus 10b and arm 324 of mechanism 310. This arrangement is part of the means for operating servotorque transmitter 338 (FIG. 14) that provides the elevation-compensating signal.

The entire mechanism 310, said to be half-scale compared to the length of arm 16–38a, could be made full-scale, as by using arm 16 itself in place of the described arm 324; and in that case, there would be no need for the feedback connections since the compensation signal generating mechanism would then be directly integrated in the head-carrying apparatus.

The accommodation provided by signals from mechanism 310 to adapt the primary motions of azimuth, radial arm length and angular elevation to the conveyor-carried article are also useful for adapting the secondary motions of tilt and swing of workhead 18a to the conveyor movement. To this end, the tilt and swing of workhead 18a is operated by the same encoders and offset servotorque receivers as in FIGS. 1-—4, with signal input from servotorque transmitters 338 and 346. The connections to the offset servotorque receivers for adjusting the tilt and swing of workhead 18a are those to produce equal and opposite compensation angles in relation to the compensation angles of the elevation of arm 16' and of the rotation of post 14'. For example, if the conveyor motion should necessitate lowering of arm 16' in FIG. 12 toward the horizontal, then workhead 18a is to be tilted upward by an equal and opposite angle in order to maintain the attitude of workhead 18a constant in space. The attitude of workhead 18a is basically a program-controlled motion. Motions of head 18a are executed and compensated for automatically. Compensation of the angles of azimuth and elevation of arm 16' are accompanied by equal and reverse compensation of the tilt and swing angles of workhead 18a in connection with a conveyor-carried article A.

The mechanism 310 of FIG. 12 is described above in connection with the use of apparatus 10b with a conveyor. However, it is readily possible to take advantage of some characteristics of this apparatus even if there were no conveyor present. For example, the mechanism 310 adapts the rest of apparatus 10b to straight line motion in one direction by providing input to motor 330. Consequently, in case straight line motion is wanted, suitable input to this motor will produce linear traverse motions of workhead 18a. Further, if uniform advances are wanted along this line from each position to the next, as in loading a pallet, then repeated equal increments to this motor 330 will produce the desired equal linear displacements of workhead 18a. These increments can even be provided under program control, as by making motor 330 part of a digital servosystem controlled by the recorded program. Motor 330 may take the form of a pulse-counting motor, advancing one small but accurate step in response to each pulse and supplied with trains of equal numbers of pulses for successive equal steps of head 18 along a line parallel to shaft 322. Successive operations may then be carried out by workhead 18a at regular-spaced locations on one or more articles along the line without the necessity of manipulating the manual controls of the apparatus in the "teach" or program-recording mode, for each such location.

The apparatus 10b of FIG. 12 is readily capable of operating between the moving conveyor and a stationary location in alternate operations, merely by incorporating the mechanism of FIG. 11 in each offset-introducing and position-encoding assembly in the same manner as already described in connection with FIG. 11.

In both of the embodiments, those of FIGS. 6 and 12, the pivot 16a of arm 16 and the longitudinal axis of arm 16 lie in a common plane. It is understood that the invention applies to equivalent apparatus. For example, there is a commercial program-controlled apparatus very similar to those illustrated in the drawings, having an armlike arm 16 herein whose longitudinal axis, when horizontal, extends along a line that is located a small but sometimes significant distance above the pivot corresponding to pivot 16a herein. This does not upset the functioning of either apparatus, provided that the manipulators 196 and 310 have corresponding configurations.

FIG. 4C shows a means for introducing a digital value offset between the control information supplied by the program recording and the hydraulic actuator and control valve system that responds to the input control information. In like manner, the apparatus of FIGS. 6—9 and that of FIGS. 12—16 may be equipped with three digital encoders representing the three offsets to be provided, in the arm length, in the elevation and in the azimuth angle. Thus, in the embodiment of FIG. 12, unit 380 (FIG. 16), unit 338 (FIG. 13), and unit 346 may be replaced by digital encoders whose output may be introduced between the several encoders 294, 292 and 290 and their respective information input registers comparable to the encoder 104, the input register 104a and the offset introduction unit 108' in FIG. 4C. The same feature may be used to advantage in the apparatus of FIGS. 6 and 7. Thus, servoreceiver 226 and differential 228 which introduce an offset between encoder 224 and the program drum may be replaced by the digital offset-introducing arrangement in FIG. 4C.

The embodiments of FIGS. 6 and 12 involve a preferred form of control means for each of the actuators, e.g. actuators 20, 34 and 38. However, in accordance with more general aspects of the invention, other forms of actuators may be substituted, such as that in application Ser. No. 686,111, filed Nov. 28, 1967, now U.S. Pat. No. 3,476,266, by George C.

Devol, and in that case once again, the offset information may be generated by mechanisms shown herein, using offset digital encoders in lieu of the servotransmitters in FIGS. 13—15 for example, and combining the data from these encoders with the primary data furnished by the primary source of control information, in the manner of FIG. 11.

A wide latitude of further variation and varied application of the novel features of the invention will be readily devised by those skilled in the art, based on the foregoing. Consequently, the invention should be construed broadly in accordance with its full spirit and scope.

We claim:

1. Apparatus for moving a workhead through a pattern of motions, including an arm operable arcuately about a first axis, said arm having a lengthwise movable part adapting the arm to be extended and retracted, said lengthwise movable part carrying said workhead, a first angular actuator for operating said arm about said first axis and a lengthwise actuator for extending and retracting said lengthwise movable part of said arm, and control apparatus for said actuators, said control apparatus including control means individual to said actuators, respectively, a linear-motion control for providing control input representing motion of said workhead along a path requiring lengthwise adjustment of said arm and angular motion of said arm, and rectilinear-to-polar converter means in at least partial control of both said individual control means and responsive to said linear-motion control for imparting a linear component of motion to the workhead.

2. Apparatus in accordance with claim 1, wherein said control apparatus includes a main source of motion control information for producing a sequence of motions of the workhead and separate means for providing control information to said linear motion control, for effecting a pattern of motions of said workhead as directed by the main source of motion control information, modified in accordance with the linear-motion control information.

3. Apparatus in accordance with claim 1, wherein said control apparatus includes a main source of motion control information to respective ones of said individual control means for producing a sequence of motions of the workhead, offset coupling means in each of said individual control means controlled by said rectilinear-to-polar converter, and separate means for providing control information to said linear motion control, for effecting a pattern of motions as directed by the main source of motion control information, modified in accordance with linear-motion control information.

4. Apparatus in accordance with claim 1, including a second linear motion control, said rectilinear-to-polar converter means including portions operable at right angles to each other, said portions being responsive to said linear-motion controls, respectively, and a main source of motion control information for said linear-motion controls for operating said converter means to impart controlled sequences of motion in at least two dimensions to said workhead.

5. Apparatus in accordance with claim 4, further including means for imposing offset motion control information on one of said linear motion controls, so that said workhead is operable through motions in accordance with said main source of motion control information as modified by the offset information means.

6. Apparatus in accordance with claim 1, wherein said arm is operable in a coordinate additional to said lengthwise and angular motions so as to carry said workhead through three-dimensional paths, and including an additional actuator and individual control means for said additional actuator.

7. Apparatus in accordance with claim 3, wherein said arm is operable in a coordinate additional to said lengthwise and angular motions so as to carry said workhead head through three-dimensional paths, and including an additional actuator and individual control means for said additional actuator responsive to said main source of information and to said converter means.

8. Apparatus in accordance with claim 6, including two additional linear-motion controls in control of said converter means, said converter means including three elements operable at right angles to each other in accordance with said three linear-motion controls, respectively, and a main source of motion control information for said linear-motion controls for operating said converter means to impart controlled sequences of motion in three dimensions to said workhead.

9. Apparatus in accordance with claim 8, further including means for imposing offset motion control information on one of said linear motion controls, so that said workhead is operable through motions in accordance with said main source of motion control information as modified by the offset information means.

10. Apparatus in accordance with claim 1, wherein said arm is operable about a second axis at right angles to said first axis, and including a second angular actuator and individual control means for said actuator at least partially controlled by said converter means.

11. Apparatus in accordance with claim 1, wherein said arm is operable about a second axis at right angles to said first axis, and including a second angular actuator and individual control means for said actuator at least partially controlled by said converter means, and wherein said control apparatus includes a main source of motion control information to respective ones of said individual control means for producing a sequence of motions of the workhead, offset coupling means in each of said individual control means controlled by said converter means, and separate means for providing control information to said linear motion control, for effecting a pattern of motions as directed by the main source of motion control information, modified in accordance with the linear-motion control information.

12. Apparatus in accordance with claim 1, wherein said arm is operable about a second axis at right angles to said first axis, and including a second angular actuator and individual control means for said second angular actuator at least partially controlled by said converter means, said converter means including three portions operable rectilinearly in accordance with the three linear-motion controls respectively, said portions being operable at right angles to each other, and a main source of motion control information for said linear-motion controls for operating said converter means to impart controlled sequences of motion in three dimensions to said workhead.

13. Apparatus in accordance with claim 12, further including means for imposing offset motion control information on one of said linear motion controls, so that said workhead is operable through motions in accordance with said main source of motion control information as modified by the offset information means.

14. Apparatus in accordance with claim 1, wherein said converter means includes first and second levers operable about a main lever axis, a third lever parallel to said first lever and operable about another axis parallel to said main lever axis, a rod carried by said first and third levers at equal distances from said axes thereof, said second lever having an operative part on and adjustable along said rod to move the rod to various angles in relation to said first lever and to various distances from said main lever axis, said linear-motion control being arranged to determine the position of said operative part of the second lever long said rod, means enforcing conjoint angular motions of said arm and said second lever, means for maintaining a constant ratio between the lengths of said arm and said second lever, and means responsive to the angular displacement between said first and second levers for at least partially controlling the individual control means of said first angular actuator.

15. Apparatus in accordance with claim 14, wherein each of said individual control means includes first and second control elements, and wherein said control apparatus includes a main source of control information for respective ones of said first control elements for producing a sequence of motions of the workhead and wherein said second control elements in said individual control means form respective portions of said means enforcing conjoint angular motions of the second lever and said arm and of said means for maintaining a constant ratio between the lengths of said arm and said second lever.

16. Apparatus in accordance with claim 1, wherein said arm is operable about a second axis at right angles to said first axis, and including a second angular actuator and individual control means for said actuator at least partially controlled by said converter, and wherein said converter means includes first and second levers operable about a main lever axis, a third lever parallel to said first lever and operable about another axis parallel to said main lever axis, a rod carried by said first and third levers at equal distances from said axes thereof, said second lever having an operative part on and adjustable along said rod to move the rod to various angles in relation to said first lever and to various distances from said main lever axis, said linear-motion control being arranged to determine the position of said operative part of the second lever along said rod, means enforcing conjoint angular motions of said arm and said second lever, means for maintaining a constant ratio between the lengths of said arm and said second lever, and means responsive to the angular displacement between said first and second levers for at least partially controlling the individual control means of said first angular actuator, a fourth lever pivoted coaxially with said second lever about a fourth-lever axis at right angles to said main lever axis, means constraining said first lever and said fourth lever to maintain equal angles to a reference plane perpendicular to said main lever axis and containing said fourth-lever axis, and monitoring means responsive to the difference between the angles of said second and fourth levers relative to said reference plane for at least partially controlling the individual control means of said second angular actuator.

17. Automatic apparatus having a workhead operable in plural degrees of freedom, including a base, a post carried by said base and operable about a vertical axis, an arm operable about a horizontal pivot on said post and having a lengthwise movable part adapting the arm to be extended and retracted, said lengthwise movable part carrying said workhead, respective actuators for operating said post about its vertical axis, for operating said arm about its pivot, and for operating lengthwise said movable part of the arm, and control apparatus for said actuators, said control apparatus including at least one linear-motion control for providing control input representing motion of said workhead along a path requiring lengthwise adjustment of said arm and angular motion of said arm, and rectilinear-to-polar converter means in control of all said actuators and responsive to said linear-motion control for moving the workhead linearly in accordance with the operation of said linear-motion control.

18. Apparatus in accordance with claim 17, wherein said control apparatus includes means providing main control information for effecting three-dimensional motions of said workhead and separate means for providing offset control information to said linear-motion control, for effecting a pattern of motions of the workhead as directed by said source of main control information, modified in accordance with the offset control information.

19. Automatic apparatus having a workhead operable in plural degrees of freedom, including a base, a post carried by said base and operable about a vertical axis, an arm operable about a horizontal pivot on said post and having a lengthwise movable part adapting the arm to be extended and retracted, said lengthwise movable part carrying said workhead, respective actuators for operating said post about its vertical axis, for operating said arm about its pivot, and for operating lengthwise said movable part of the arm, and control apparatus for said actuators, said control apparatus including individual control means for said actuators, respectively, at least one linear-motion control for providing control input representing motion of said workhead along a path requiring lengthwise adjustment of said arm and angular motion of said arm, and rectilinear-to-polar converter means in control of all said individual control means and responsive to said linear-motion control for moving the workhead linearly in accordance with the operation of said linear-motion control.

20. Apparatus in accordance with claim 19, wherein said control apparatus includes means providing main control information to said individual control means for said actuators for effecting three-dimensional motions of said workhead, offset control devices between said converter means, and said individual control means, and separate means for providing offset control information to said linear-motion control, for effecting a pattern of motions of the workhead as directed by said source of main control information, modified in accordance with the offset control information.

21. Apparatus in accordance with claim 19, further including two additional linear controls, said converter means including three portions operable rectilinearly in accordance with the three linear controls and said portions being operable along lines mutually at right angles to each other and forming a three-dimensional rectangular coordinate operating unit, said converter means including a control lever operated by said rectangular coordinate operating unit longitudinally and about mutually perpendicular axes and control elements operated by said control lever for operating the individual control means of said actuators.

22. Automatic apparatus having a workhead operable in plural degrees of freedom, including a base, a post carried by said base and operable about a vertical axis, an arm operable about a horizontal pivot on said post and having a lengthwise movable part adapting the arm to be extended and retracted, said lengthwise movable part carrying said workhead, respective actuators for operating said post about its vertical axis, for operating said arm about its pivot, and for operating lengthwise said movable part of the arm, control apparatus for said actuators, means carried by said lengthwise movable part of said arm supporting said workhead for pivotal operation about secondary axes parallel to said vertical and horizontal axes, actuators for operating said workhead about said secondary-motion axes, and parallel-motion mode control means for said workhead operating actuators for maintaining constant aim of said workhead despite angular motions of said arm and said arm support about the respective axes thereof.

23. Apparatus in accordance with claim 22, wherein said control means further includes individual primary-motion control means for said actuators of said post, said arm and said lengthwise movable part of said arm, respectively, at least one linear-motion control, and a converter in control of all said primary-motion actuator control means and responsive to said linear-motion control for moving the workhead linearly in accordance with the operation of said linear-motion control while said parallel-motion control means maintains constant aim of said workhead.

24. Apparatus having a workhead operable in three dimensions including a rotatable post, an arm transversely pivoted to said post and a telescopic arm extension carrying said workhead, respective actuators for rotating said post, for operating said arm about its pivot and for extending and retracting said arm extension, a control lever movable about said post and about a transverse pivot, and having a telescopic lever extension and control head thereon, servocontrols for said actuators having feedback connections to said post, said arm and said arm extension, respectively, and said servocontrols having control parts controlled by said control lever and arranged to cause motions of said workhead by said actuators that correspond to movements imposed on the control head of said control lever.

25. Apparatus in accordance with claim 24, further having means for operating said control lever and including a three-dimensional rectangular coordinate manipulating unit for the control head of said control lever, and rectangular coordinate information supply means for controlling said manipulating unit.

26. Apparatus in accordance with claim 25, further including a conveyor for carrying objects along a path in the operating range of said workhead and parallel to one of the rectangular coordinates of said three-dimensional manipulating unit, a coordinating control operable coordinately with the conveyor, and offset means controlled by said coordinating control and interposed in said control lever operating means for modifying the response to said information supply means.

27. Apparatus in accordance with claim 24, further including a conveyor for carrying objects along a path in the operating range of said workhead, a three-dimensional rectangular coordinate manipulating unit for said control head of the control lever, rectangular coordinate information supply means for controlling said manipulating unit, said manipulating unit including an operating part disposed parallel to said conveyor and having control means responsive to said information supply means, a coordinating coupling from said conveyor to the last-named control means for modifying progressively the operation thereof to combine the control effect of the information supply means with the progressive change provided by the control coupling, and means for alternately rendering said coordinating coupling effective and for eliminating its effect with respect to said last-named control means.

28. Automatically controlled apparatus responsive to rectangular coordinate control information, including a controlled element, means for operating said element in a three-dimensional space including three actuating devices individually responsive to respective components of control information and operable in mutually perpendicular directions, a source of rectangular coordinate control information for determining the movements of said element, and means for modifying the operation of said element pursuant to said source of control information comprising an offset information control source, and means combining the control effects of said rectangular coordinate source of control information and said offset control source for controlling at least one of said actuating devices.

29. Apparatus in accordance with claim 28, wherein said offset source is a servotransmitter and said combining means includes a servoreceiver and means combining the control effects of said servoreceiver and one of said control information-responsive actuating devices.

30. Apparatus in accordance with claim 24, further including individual control means for controlling said actuators, respectively, information supply means for controlling said individual control means, said individual control means also including parts responsive to the operation of said control lever, and means for operating said control lever and thereby modifying the operation of the apparatus pursuant to said information supply means.

31. Apparatus in accordance with claim 30, further including a conveyor movable along a line near said post, and wherein said control lever-operating means includes a linear actuating means disposed to operate said control head along a line parallel to the conveyor and a servolink synchronizing the operation of said linear-actuating means with said conveyor.

32. Apparatus for executing operations under automatic control, including a workhead operable in at least two dimensions, said apparatus having an arm movable about a first axis and said arm supporting said workhead for movement toward and away from said axis, a first angular actuator for moving said are about said axis, a lengthwise arm actuator for moving said workhead toward and away from said first axis, and apparatus for controlling said actuators, said control apparatus including separate control means for said actuators, respectively, means providing control signals having rectangular coordinate signal components, and rectangular-to-polar converter means coupled to said separate control means in control thereof and having respective portions operable in mutually perpendicular directions in response to said rectangular coordinate signal components, respectively, for controlling the movements of said workhead.

33. Apparatus in accordance with claim 32, wherein said converter means includes a master control lever operable by said respective portions of said converter means for controlling said separate control means, said master lever being operable about a first lever axis and having a part movable toward and away from said first lever axis and coupled to said separate control means.

34. Apparatus in accordance with claim 32, adapted for operation in coordination with a straight line conveyor disposed adjacent thereto and operable along a path parallel to one of said rectangularly operable portions of said converter, and means for imposing a progressive offset representing the motion of the conveyor on the response of said one of said respective portions of the converter means to one of the rectangular coordinate signal components, so that the motions that would be executed by the apparatus in a given stationary space in response to the provided signals are executed in a like space that moves linearly with the conveyor.

35. Apparatus in accordance with claim 34, wherein said converter means includes a master control lever operable by said respective portions of said converter means for controlling said control devices, said master lever being operable about a first lever axis and having a part movable along the master lever toward and away from said first lever axis.

36. Apparatus in accordance with claim 34, for moving the workhead in three dimensions in coordination with said straight line conveyor, wherein said arm is additionally movable about a second axis at right angles to said first axis, and has a second angular actuator for operating said arm about said second axis, and said control apparatus having control means for said second angular actuator controlled by said converter means.

37. Apparatus in accordance with claim 36, wherein said converter means includes a master lever operated by said rectangular coordinate signal-responsive portions of the converter means for controlling said separate control means, said master lever being operable about first and second lever axes at right angles to each other and having a part movable toward and away from one of said lever axes.

38. Apparatus in accordance with claim 32, for moving the workhead in three dimensions, wherein said arm is additionally movable about a second axis at right angles to said first axis, further including a second angular actuator for operating said arm about said second axis, and said actuator controlling means having a separate control means for said second angular actuator controlled by said converter means in response to separate components of the rectangular coordinate signals.

39. Apparatus in accordance with claim 38, wherein said converter means includes a master control lever operable by said rectangular coordinate signal-responsive portions of said converter means for controlling each said separate control means, said master lever being operable about a first lever axis and having a part movable toward and away from said first lever axis, and said lever also being operable about a second lever axis at right angles to said first lever axis.

40. Apparatus in accordance with claim 32, wherein said workhead includes a workhead and a secondary unit supporting said workhead for movement about a secondary axis parallel to said first axis, an actuator for moving said secondary unit about said secondary axis, and control means for said last-named actuator controlled by said converter means in common with but inversely to the control of said control means of said first angular actuator so that angular motions of said arm concur with equal and reverse angular motions of said secondary unit, without resort to separate control by said converter means, for maintaining constant aim of said secondary unit despite angular changes of said arm response to control signal input to said converter.

41. Apparatus in accordance with claim 40, including secondary control signal-responsive means additional to said control means of said first angular actuator for establishing a basic orientation of said workhead relative to said arm, said basic orientation being modified by the control derived from said converter means, so that a basic orientation of the workhead can be established under control of a secondary control signal, and can be maintained during the converter-controlled angular movements of said arm.

42. Apparatus in accordance with claim 40, adapted for operation in coordination with a conveyor disposed adjacent thereto and operable along a path parallel to one of said right-angled portions of said converter means, including means coupled to said conveyor for imposing a progressive offset representing the motion of the conveyor on the response of said one right-angled portion of the conveyor means to said control signal-providing means, so that the motions that would be executed by the apparatus in a given stationary space in response to the control signals are executed in a like space that moves with the conveyor.

43. Apparatus in accordance with claim 38, including means supporting said workhead on the arm for movement about a first secondary axis parallel to said first axis and a shaft supporting said workhead for movement about a secondary axis parallel to said second axis, first and second secondary actuators for moving said workhead about said first and second secondary axes, respectively, and parallel-motion control means for causing said secondary actuators to operate said workhead about said secondary axes so that angular motions of said arm about its axes pursuant to said rectangular component control signals are accompanied by equal and opposite angular motions of said workhead about said secondary axes for automatically maintaining a constant direction of said workhead.

44. Apparatus in accordance with claim 43, wherein said converter means includes a master lever operated by respective right-angled signal-responsive portions of the converter means for controlling said control devices, said master lever being operable about first and second lever axes at right angles to each other and having a part movable toward and away from one of said lever axes.

45. Apparatus in accordance with claim 43, adapted for operation in coordination with a conveyor disposed adjacent thereto and operable along a path parallel to one of said respective portions of said converter means further including means for imposing a progressive offset representing the motion of the conveyor on the response of said one respective portion of the converter means to said control signal-providing means, so that the motions that would be executed by the arm and the workhead in a given stationary space are executed in a like space that moves with the conveyor.

46. Apparatus in accordance with claim 32, wherein said control signal providing means provides a sequence of digital signals representing successive coordinates to which the workhead is to move and wherein said converter means includes actuating means and a digital encoder for each rectangular coordinate signal component and respective digital comparison means for each said actuator for developing a match between the signals of said encoder and said digital signal-providing means.

47. Control signal-responsive apparatus, including a workhead, an arm operable about a first axis and carrying said workhead for movement of the latter about a second axis spaced from and parallel to said first axis, first and second actuators for operating said arm and said workhead about said first and second axes, respectively, first control means for said actuator of said arm, said first control means including means for providing digital control signals for causing said first actuator to operate said arm through controlled angles about said first axis, and second control means for said second actuator of said workhead, said second control means including means for deriving from said first control means additional digital signals representing the the controlled angles of motion of said arm about said first axis, said second control means being arranged to effect angular operations of said workhead relative to said arm about said second axis that are equal and opposite to the angular motions of said arm about said first axis so that said workhead is adapted to maintain constant aim during operations of said arm about said arm about said first axis.

48. Control signal-responsive apparatus in accordance with claim 47, wherein said first control means for the arm actuator includes a first digital encoder for providing digital signals representing the position of said arm about said first axis and comparison means responsive to the difference between the digital signals from said digital control signal-providing means and said first encoder for controlling said first actuator, and wherein said second control means includes a second digital encoder for providing digital signals representing the position of said workhead about said second axis in relation to said arm, second signal providing means for supplying independent digital control signals for said workhead, comparison means responsive to the difference between the digital signals from said second digital encoder and said second signal providing means and to the digital signals from said digital signal deriving means, so that the aim of said workhead can be established and then maintained during successive angular motions of said arm.

49. Control signal-responsive apparatus in accordance with claim 47, wherein said second control means additionally includes means for providing digital signals for causing said second actuator to operate said workhead through controlled angles, so that the aim of said workhead can be established and then maintained during successive angular motions of said arm.

50. Automatically operable apparatus including a workhead, a source of control information, actuating means operable to transport response to control information from said source of information to transport said workhead through a sequence of three-dimensional motions in space, optionally operable means operable to introduce at least a two-dimensional offset in the operation of said workhead transporting means pursuant to the control information from said source, and means for alternately rendering said offset effective and eliminating the offset during the sequence of motions.

51. Automatically operable apparatus in accordance with claim 50, further including a conveyor and means for operating said offset introducing means so as to produce progressively increasing offsets in accordance with the advance of said conveyor, said control information including portions directing the workhead to a discrete space moving with a segment of the conveyor and to a stationary space near the conveyor, and further control information supply means for rendering the offset-introducing means alternately effective and ineffective during the advance of said discrete segment of the conveyor so that the workhead is operable alternately between the moving space that advances progressively with conveyor and the stationary space, and there is a continuous increase of the offset during the operation of the workhead at said stationary space.

52. Article transfer apparatus having an article holder, apparatus for moving the article holder in three-dimensional paths, and control means for said article holder moving apparatus, said control means including program control means having successively effective portions for causing said article holder to execute repeatedly a sequence of motions including a motion of said article holder to a supply position and a motion of said article holder to a discharge position, said program, control means further including means for controlling said program control means further including means for controlling said article holder to seize an article at said supply position and to release an article at said discharge position, said control means further including means for providing progressively increasing offset information, and means for rendering said article holder moving means responsive jointly to said offset information-providing means and to the portion of said program control means that is effective to cause motion of the article holder to one of said positions for causing the article holder to move to successive positions progressively displaced from said one of said positions in the course of successive sequences of motions.

53. Article transfer apparatus in accordance with claim 52, wherein said control means includes means for rendering said offset-providing means ineffective to modify the motion of said article holder to the other of said positions in the course of said successive sequences of motions.

54. Article transfer apparatus in accordance with claim 52, wherein said article transfer apparatus is adapted to load a pallet and wherein said one of said positions is said discharge position.

55. Article transfer apparatus in accordance with claim 52, wherein said offset information-providing means includes components rated to three mutually perpendicular directions corresponding to rows, tiers and layers such as those of a pallet.